(12) United States Patent
König et al.

(10) Patent No.: US 7,694,318 B2
(45) Date of Patent: Apr. 6, 2010

(54) VIDEO DETECTION AND INSERTION

(75) Inventors: Richard König, Bern (CH); Charles A. Eldering, Doylestown, PA (US); Rainer Wolfgang Lienhart, Santa Clara, CA (US); Christine Lienhart, Santa Clara, CA (US)

(73) Assignee: Technology, Patents & Licensing, Inc., Doylestown, PA (US)

( * ) Notice: Subject to any disclaimer, the term of this patent is extended or adjusted under 35 U.S.C. 154(b) by 1141 days.

(21) Appl. No.: 10/790,468

(22) Filed: Mar. 1, 2004

(65) Prior Publication Data

US 2004/0189873 A1    Sep. 30, 2004

Related U.S. Application Data

(60) Provisional application No. 60/510,896, filed on Oct. 14, 2003, provisional application No. 60/452,802, filed on Mar. 7, 2003.

(51) Int. Cl.
*H04N 7/10* (2006.01)
(52) U.S. Cl. .......................................... 725/32; 725/36
(58) Field of Classification Search .................. 725/32, 725/33, 34, 35, 36; 348/700–703, 616
See application file for complete search history.

(56) References Cited

U.S. PATENT DOCUMENTS

| | | | |
|---|---|---|---|
| 4,888,638 A | 12/1989 | Bohn | |
| 4,974,085 A | 11/1990 | Campbell | |
| 5,029,014 A | 7/1991 | Lindstrom | |
| 5,155,591 A | 10/1992 | Wachob | |
| 5,319,455 A | 6/1994 | Hoarty et al. | |
| 5,389,964 A | 2/1995 | Oberle | |
| 5,436,653 A * | 7/1995 | Ellis et al. ..................... | 725/22 |
| 5,446,919 A | 8/1995 | Wilkins | |
| 5,574,572 A | 11/1996 | Malinowski et al. | |
| 5,600,366 A | 2/1997 | Schulman | |
| 5,661,516 A | 8/1997 | Carles | |
| 5,668,917 A | 9/1997 | Lewine | |
| 5,715,018 A | 2/1998 | Fasciano | |
| 5,748,263 A | 5/1998 | Ball | |
| 5,774,170 A | 6/1998 | Hite | |
| 5,892,536 A | 4/1999 | Logan | |
| 5,973,723 A | 10/1999 | DeLuca | |

(Continued)

FOREIGN PATENT DOCUMENTS

EP    1313313    5/2003

(Continued)

OTHER PUBLICATIONS

Gauch J. M. et al; "Identification of New Commercials Using Repeated Video Sequence Detection", Proceedings of IEEE International Conf. on Image Processing, ICIP '2005, Sep. 11, 2005, pp. 1252-1255.

(Continued)

*Primary Examiner*—Brian T Pendleton
*Assistant Examiner*—Jean D. Saintcyr

(57) ABSTRACT

A television signal substitution system that replaces known video segments such as advertisements with selected replacement advertisements. Fingerprint data of known advertisements can be stored in a fingerprint database. When new fingerprint data is available, the fingerprint data can be automatically or manually transmitted to subscribers. Various techniques can be used to identify advertisements based on the fingerprint data.

14 Claims, 20 Drawing Sheets

U.S. PATENT DOCUMENTS

| | | | |
|---|---|---|---|
| 5,973,750 A | 10/1999 | Ogawa et al. | |
| 5,978,381 A | 11/1999 | Perlman et al. | |
| 5,986,692 A | 11/1999 | Logan | |
| 5,987,210 A | 11/1999 | Iggulden et al. | |
| 5,999,689 A | 12/1999 | Iggulden | |
| 6,002,443 A | 12/1999 | Iggulden | |
| 6,078,896 A | 6/2000 | Kaehler | |
| 6,100,941 A * | 8/2000 | Dimitrova et al. | 348/700 |
| 6,122,016 A | 9/2000 | DeHaan | |
| 6,404,977 B1 | 6/2002 | Iggulden | |
| 6,425,127 B1 | 7/2002 | Bates | |
| 6,446,261 B1 | 9/2002 | Rosser | |
| 6,463,585 B1 | 10/2002 | Hendricks | |
| 6,469,749 B1 | 10/2002 | Dimitrova | |
| 6,487,721 B1 * | 11/2002 | Safadi | 725/36 |
| 6,490,370 B1 | 12/2002 | Krasinski et al. | |
| 6,577,346 B1 | 6/2003 | Perlman | |
| 6,593,976 B1 | 7/2003 | Lord | |
| 6,597,405 B1 | 7/2003 | Iggulden | |
| 6,633,651 B1 | 10/2003 | Hirzalla | |
| 6,646,655 B1 * | 11/2003 | Brandt et al. | 715/723 |
| 6,675,174 B1 | 1/2004 | Bolle et al. | |
| 6,698,020 B1 | 2/2004 | Zigmond et al. | |
| 6,721,733 B2 | 4/2004 | Lipson et al. | |
| 6,738,978 B1 | 5/2004 | Hendricks et al. | |
| 6,771,316 B1 | 8/2004 | Iggulden | |
| 6,819,863 B2 | 11/2004 | Dagtas et al. | |
| 6,892,193 B2 | 5/2005 | Bolle et al. | |
| 6,912,571 B1 | 6/2005 | Serena | |
| 6,987,883 B2 | 1/2006 | Lipton et al. | |
| 7,020,304 B2 | 3/2006 | Alattar et al. | |
| 7,051,351 B2 | 5/2006 | Goldman | |
| 7,055,166 B1 * | 5/2006 | Logan et al. | 725/32 |
| 7,062,084 B2 | 6/2006 | Messing et al. | |
| 7,064,796 B2 | 6/2006 | Roy et al. | |
| 7,089,575 B2 | 8/2006 | Agnihotri et al. | |
| 7,110,454 B1 | 9/2006 | Chakraborty | |
| 7,146,632 B2 | 12/2006 | Miller | |
| 7,185,044 B2 | 2/2007 | Ryan et al. | |
| 7,266,832 B2 | 9/2007 | Miller | |
| 7,269,330 B1 | 9/2007 | Iggulden | |
| 7,272,295 B1 | 9/2007 | Christopher | |
| 7,298,962 B2 | 11/2007 | Quan | |
| 7,327,885 B2 | 2/2008 | Divakaran et al. | |
| 7,461,392 B2 * | 12/2008 | Herley | 725/19 |
| 2002/0010919 A1 | 1/2002 | Lu et al. | |
| 2002/0059580 A1 | 5/2002 | Kalker | |
| 2002/0067730 A1 | 6/2002 | Hinderks | |
| 2002/0069218 A1 | 6/2002 | Sull et al. | |
| 2002/0072966 A1 | 6/2002 | Eldering | |
| 2002/0075402 A1 | 6/2002 | Robson | |
| 2002/0083439 A1 | 6/2002 | Eldering | |
| 2002/0120925 A1 | 8/2002 | Logan | |
| 2002/0126224 A1 | 9/2002 | Lienhart | |
| 2002/0186957 A1 | 12/2002 | Yuen | |
| 2002/0194592 A1 | 12/2002 | Tsuchida et al. | |
| 2003/0001970 A1 | 1/2003 | Petry | |
| 2003/0001977 A1 | 1/2003 | Wang | |
| 2003/0023972 A1 | 1/2003 | Gutta | |
| 2003/0093790 A1 | 5/2003 | Logan et al. | |
| 2003/0115595 A1 | 6/2003 | Stevens et al. | |
| 2003/0122966 A1 | 7/2003 | Markman et al. | |
| 2003/0123841 A1 | 7/2003 | Jeannin | |
| 2003/0192045 A1 | 10/2003 | Fellenstein et al. | |
| 2003/0192046 A1 | 10/2003 | Spehr | |
| 2003/0192050 A1 | 10/2003 | Fellenstein et al. | |
| 2003/0226150 A1 | 12/2003 | Berberet et al. | |
| 2003/0227475 A1 | 12/2003 | Fellenstein et al. | |
| 2004/0001161 A1 | 1/2004 | Herley | |
| 2004/0019904 A1 | 1/2004 | Fellenstein et al. | |
| 2004/0128317 A1 | 7/2004 | Sull et al. | |
| 2004/0194130 A1 | 9/2004 | König | |
| 2004/0226035 A1 | 11/2004 | Hauser | |
| 2004/0228605 A1 | 11/2004 | Quan | |
| 2004/0237102 A1 | 11/2004 | König | |
| 2004/0260682 A1 | 12/2004 | Herley et al. | |
| 2005/0015795 A1 * | 1/2005 | Iggulden | 725/20 |
| 2005/0044561 A1 | 2/2005 | McDonald | |
| 2005/0120367 A1 | 6/2005 | Linzer | |
| 2005/0149968 A1 | 7/2005 | König | |
| 2005/0166224 A1 * | 7/2005 | Ficco | 725/35 |
| 2005/0172312 A1 | 8/2005 | Lienhart | |
| 2005/0177847 A1 | 8/2005 | König | |
| 2005/0193410 A1 | 9/2005 | Eldering | |
| 2005/0283796 A1 | 12/2005 | Flickinger | |
| 2006/0195861 A1 | 8/2006 | Lee | |
| 2007/0130581 A1 * | 6/2007 | Del Sesto et al. | 725/36 |
| 2007/0248224 A1 | 10/2007 | Buskey et al. | |

FOREIGN PATENT DOCUMENTS

| | | |
|---|---|---|
| GB | 2361127 | 10/2001 |
| GB | 2361128 | 10/2001 |
| GB | 2365649 | 2/2002 |
| GB | 2399976 | 9/2004 |
| JP | 11185039 | 7/1999 |
| JP | 11213163 | 8/1999 |
| JP | 21024956 | 1/2001 |
| JP | 21111921 | 4/2001 |
| JP | 22329205 | 11/2002 |
| WO | WO9856128 A1 | 12/1998 |
| WO | WO9966719 A1 | 12/1999 |
| WO | WO0036775 | 6/2000 |
| WO | WO00054504 A1 | 9/2000 |
| WO | WO00/70869 | 11/2000 |
| WO | WO0133848 | 5/2001 |
| WO | WO02/03227 | 1/2002 |
| WO | WO02102079 A1 | 12/2002 |
| WO | WO03/052551 A2 | 6/2003 |
| WO | WO03/105377 | 12/2003 |

OTHER PUBLICATIONS

Pua K. M. et al; "Real time repeated video sequence identification", Computer Vision and Image Understanding Academic Press, San Diego, CA, vol. 93, No. 3, Mar. 2004, pp. 310-327.

Naturel, X et al; "A fast shot matching strategy for detecting duplicate sequences in a television stream", Proceedings of the 2nd International Workshop on Computer Vision Meets Databases, Baltimore, MD, International Conference Proceeding Series, Jun. 17, 2005, pp. 21-27. ACM Press, NY.

Rainer Lienhart et al, On the Detection and REcognition of Television Commercials, University of Mannheim, Praktische Informatik vol. IV, Apr. 1997, 509-516, Mannheim, Germany.

Product Literature, "A Feature-Based Algorithm for Detecting and Classifying Production Effects" printed from http://www.c.s.cornell.edu/rdz/Papers/Archive/90070119 on Mar. 26, 2004.

Product Literature, Mork, Peter et al, "Indexing Tamper Resistant Features for Image Copy Detection," printed from the hhttp://www-db.stanford.edu/chenli/rime/demo1.0.html on Mar. 26, 2004; 1999; 5 pp.

IEEE Paper "Localizing and Segmenting Text in Images and Videos" by Lienhart, R. and Wernicke, A., Apr. 2002, 13 pp.

Minerva M. Yeung & Bede Liu, Efficient Matching and Clustering of Video Shots, Sep. 1995, 338-341, Princeton Univeristy, Princeton, NJ.

G. M. Landau and U. Vishkin, Pattern matching in a digitized image. Algorithmica, 12(3/4):375-408, 1994.

Greg Pass, Ramin Zabih, Justin Miller, Comparing Images Using Color Coherence Vectors. ACM Multimedia 1996: 65-73.

Fullà, et al; "Detección de anuncios en secuencias de televisión"; Universidad Politécnia de Valencia, Dept de Comunicaciones, Oct. 13, 2003, 100 pgs.

Fullà et al, "Detection of TV Commercials"; Technical University of Valencia, pp. 541-544.

Dimitrova, et al; "On Selective Video Content Analysis & Filtering"; IS&T/SPIE Conf. on Storage and Retrieval of Media Databases; Jan. 2000; SPIE vol. 3972; 10 pgs.

Dimitrova, et al; "Applications of Video Content Analysis and Retrieval"; IEEE Multimedia, Jul.-Sep. 2002; pp. 42-54.

Drucker; et al; "Smartskip: Consumer Level Browsing and Skipping of Digital Video Content"; Technology to Help people find information; Minn, MN; Apr. 20-25, 2002; vol. 4, Issue 1; pp. 219-226.

U.S. Appl. No. 11/120,095, Lienhart.

U.S. Appl. No. 11/067,003, König.

U.S. Appl. No. 11/067,196, Eldering.

U.S. Appl. No. 11/135,135, Lienhart.

U.S. Appl. No. 11/112,529, Petersen.

U.S. Appl. No. 09/553,637, filed Apr. 20, 2000, Eldering et al.

U.S. Appl. No. 10/031,268, filed Mar. 23, 2002, Eldering et al.

U.S. Appl. No. 09/568,084, May 1, 2000, Eldering.

U.S. Appl. No. 09/635,539, filed Aug. 10, 2000, Eldering.

U.S. Appl. No. 10/031,142, Nov. 1, 2001, Eldering.

U.S. Appl. No. 09/694,848, filed Oct. 20, 2000, Hamilton.

U.S. Appl. No. 10/049,246, filed Jan. 20, 2002, Hamilton.

U.S. Appl. No. 09/635,544, filed Aug. 10, 2000, Eldering et al.

U.S. Appl. No. 09/712,790, filed Nov. 14, 2000, Eldering et al.

U.S. Appl. No. 09/658,204, Sep. 8, 2000, Eldering.

U.S. Appl. No. 09/680,622, filed Oct. 6, 2000, Flickinger.

U.S. Appl. No. 10/759,620, filed Jan. 16, 2004, Eldering et al.

NextStream, "A Solution for Ad Insertion within a Digital Television Network"; Sep. 2003.

D.C. Hutchison et al., "Application of Second Generation Advanced Multi-media Display Processor (AMDP2) in a Digital Micro-Mirror Array Based HDTV", IEEE, 2001.

E. McGrath, "Digital Insertion of Advertising into a Digital Stream (DID)", International Broadcasting Convention, IEEE 1997.

\* cited by examiner

100 ∽ INPUT VIDEO SIGNAL

102 ∽ DETECTION AND REPLACEMENT SYSTEM

104 ∽ OUTPUT VIDEO SIGNAL

*FIG. 1*

VIDEO DETECTION AND INSERTION

CROSS-REFERENCE TO RELATED APPLICATIONS

This patent application claims priority to the provisional patent application entitled, "System and Method for Advertisement Substitution in Broadcast and Prerecorded Video Streams" filed on Mar. 7, 2003, Ser. No. 60/452,802, which is incorporated by reference herein. This patent application also claims priority to the provisional patent application entitled, "Video Detection and Insertion," filed on Oct. 14, 2003, Ser. No. 60/510,896, which is also incorporated by reference herein.

This patent application is related to the patent applications entitled "Method and System for Advertisement Detection and Substitution" filed herewith, attorney docket number HMM-100 and "Advertisement Substitution" filed herewith, attorney docket number HMM-101.

BACKGROUND OF THE INVENTION

The present invention is directed to a system, method, and computer readable storage for detecting segments such as advertisements in a video signal and replacing the detected segments with replacement portions such as targeted advertisements.

Advertisements are commonplace in most broadcast video, including video received from satellite transmissions, cable television networks, over-the-air broadcasts, and digital subscriber line (DSL) systems. Advertising plays an important role in the economics of entertainment programming in that advertisements are used to subsidize or pay for the development of the content. As an example, broadcast of sports such as football games, soccer games, basketball games and baseball games is paid for by advertisers. Even though subscribers may pay for access to that sports programming, such as through satellite or cable network subscriptions, the advertisements appearing during the breaks in the sport are sold by the network producing the transmission of the event.

In some countries, such as the United Kingdom, sports events are frequently viewed in public locations such as pubs and bars. Pubs, generally speaking, purchase a subscription from a satellite provider for reception of sports events. This subscription allows for the presentation of the sports event in the pub to the patrons. The advertising to those patrons may or may not be appropriate depending on the location of the pub, the make up of the clientele, the local environment, or other factors. The advertising may even promote products and services which compete with those stocked or offered by the owner of the pub. To date, no system or method has been developed to allow the pub owner to automatically and accurately substitute existing ads and resell more appropriate advertising.

Another environment in which advertising is presented to consumers through a commercial establishment is in hotels. In hotels, consumers frequently watch television in their rooms and are subjected to the defacto advertisements placed in the video stream. Hotels sometimes have internal channels containing advertising directed at the guests, but this tends to be an "infomercial" channel that does not have significant viewership. As is the case for pubs, the entertainment programming video streams may be purchased on a subscription basis from satellite or cable operator, or may simply be taken from over-the-air broadcasts. In some cases, the hotel operator offers Video on Demand (VoD) services, allowing consumers to choose a movie or other program for their particular viewing. These movies are presented on a fee basis, and although there are typically some types of advertising before the movie, viewers are not subjected to advertising during the movie. To date, no system or method has been introduced which allows establishments such as hotels and hospitals to increase the effectiveness of their advertising opportunities based on the captive audience. Similarly, no system has yet been introduced which allows hotel operators to ensure that advertisements for competitors' products and services are not shown to guests in their premises.

Hospitals also provide video programming to the patients, who may pay for the programming based on a daily fee, or in some instances on a pay-per-view basis. The advertising in the programming is not specifically directed at the patients, but is simply the advertising put into the programming by the content provider.

Residential viewers are also presented advertisements in the vast majority of programming they view. These advertisements may or may not be the appropriate advertisements for that viewer or family. Various methods have been developed to provide for the switching of channels during advertising opportunities, such that the user is forced to watch an advertisement different than that presented in the original programming, and are known as "forced channel tuning" techniques. These techniques suffer from a fundamental bandwidth constraint in that extra channels are needed to carry alternate advertisements. These channels occupy bandwidth that would ordinarily be used for revenue generating programming including Pay-Per-View (PPV) or VoD channels. Transport of alternate advertisements thus "robs" bandwidth from other revenue generating opportunities.

The advent of the Personal Video Recorder (PVR) also provides for the opportunity to replace advertisements, although PVRs also allow consumers to simply skip over the ads, either by fast-forwarding, or in some cases through the use of an "ad-skip" feature on the PVR.

For the foregoing reasons, there is a need for a system and method that allows for the insertion of advertisements in video streams, and in particular in video streams presented to audiences that do not have the ability to fast-forward through the advertisements. There is also a need for a system which allows advertisements to be better targeted to audiences and for the ability for operators of commercial premises to cross-market services and products to the audience. Additionally, there is a need for a system which enables the operators of commercial premises to eliminate and substitute advertising of competitors' products and services included in broadcasts shown to guests on their premises.

SUMMARY OF THE INVENTION

It is an aspect of the present invention to provide an improved system for detecting segments in video programming and replacing the detected segments with a replacement portion.

The above aspects can be obtained by a method that includes (a) receiving an input video signal; (b) automatically identifying a segment in the input video signal locally using fingerprint data of both the segment and the input video signal; and (c) generating an output video signal comprising the input video signal with the segment replaced with a replacement portion.

The above aspects can also be obtained by a method that includes (a) analyzing video segments and computing fingerprint data; (b) storing the fingerprint data in a database; and (c) transmitting the fingerprint data to subscribers on a computer communications network.

The above aspects can also be obtained by a method that includes (a) creating a fingerprint of a portion of an incoming video stream; (b) retrieving at least one stored fingerprint, wherein the stored fingerprint represents a known video segment; (c) comparing the fingerprint with the at least one stored fingerprint to determine the presence of a known video segment in the incoming video stream; and (d) replacing the known video segment in the incoming stream with a replacement video segment.

The above aspects can also be obtained by an apparatus that includes (a) an analyzer analyzing video segments and computing fingerprint data; (b) a fingerprint database storing the fingerprint data; and (c) a transmitting unit transmitting the fingerprint data to requestors on a computer communications network.

The above aspects can also be obtained by an apparatus that includes (a) an identifying unit identifying a segment in an input video signal using fingerprint data; (b) a replacing unit replacing the segment in the input video signal with a replacement portion to generate an output video signal; and (c) an output unit generating the output video signal.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 1 is a block diagram illustrating a general principle of the present invention, according to an embodiment of the present invention;

DETAILED DESCRIPTION OF PREFERRED EMBODIMENTS OF THE INVENTION

Figure 2:
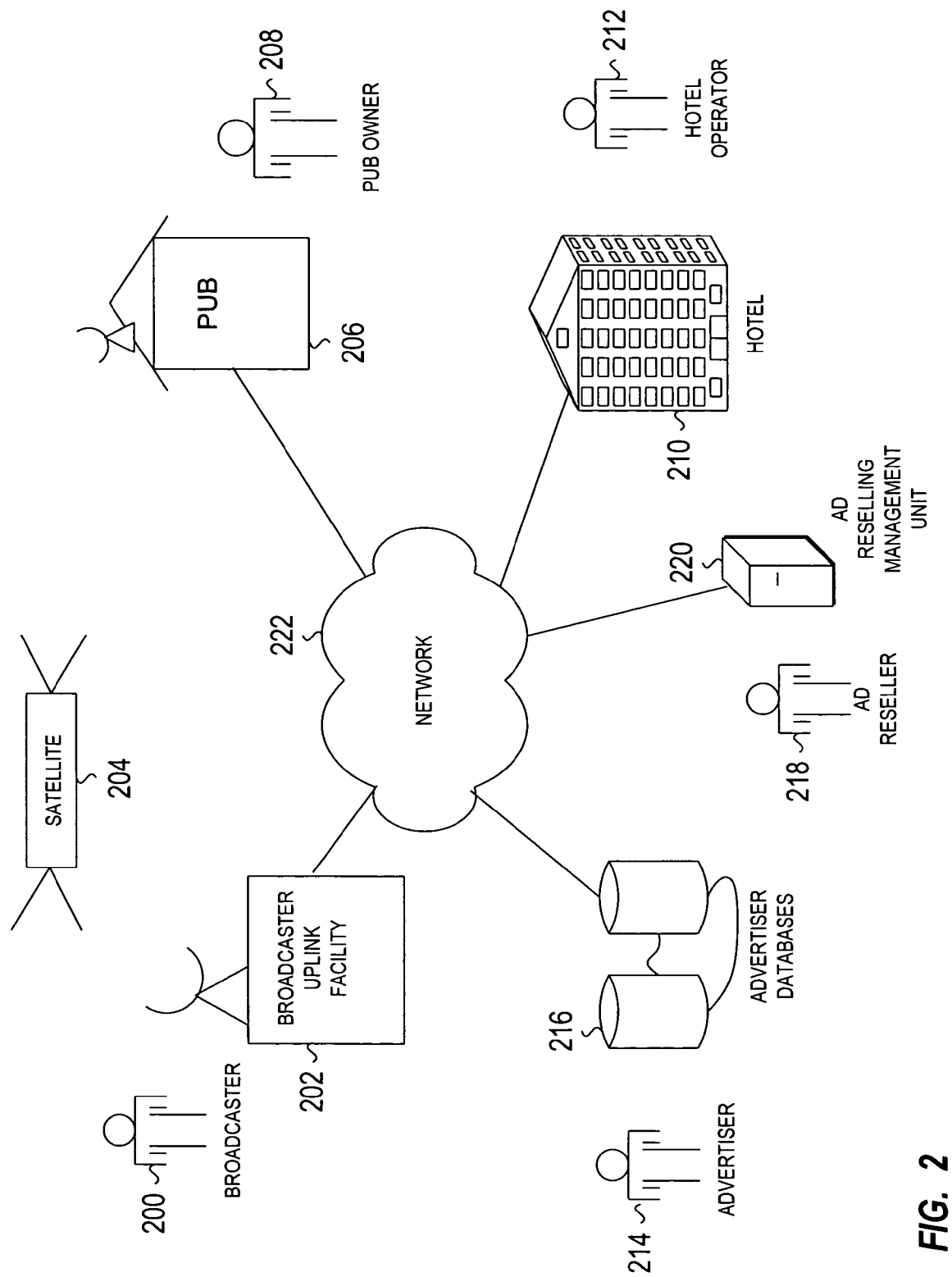
FIG. 2 is a block diagram representing a user-relationship, according to an embodiment of the present invention.

In describing an embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

Reference will now be made in detail to the presently preferred embodiments of the invention, examples of which are illustrated in the accompanying drawings, wherein like reference numerals refer to like elements throughout.

The present invention relates to a system for replacing an advertisement in a video signal with a replacement advertisement, although the invention is not limited to advertisements. Generic advertisements can be replaced by the system with advertisements either targeted specifically to the viewer or a group of viewers, or replaced with advertisements which better serve the operators of the replacement system.

As a particular example of one embodiment of the present invention, suppose a viewer is watching a football game which contains an advertisement for a compact car. The replacement system can replace the automobile advertisement with a targeted advertisement for the viewer. For example, if the system knows the viewer is a wealthy male in his 40's, an advertisement for a luxury car can be substituted, which would be more effective than the generic advertisement. As another example, viewers in a pub may watch a video broadcast in which the generic advertisements can be replaced with advertisements chosen by the pub for a particular beer. As yet another example, viewers tuning a television in a hotel or hospital can be subjected to targeted advertisements as well.

FIG. 1 is a block diagram illustrating a general principle of the present invention, according to an embodiment of the present invention.

An input video signal 100 is input into a detection and replacement system 102. The input video signal 100 can be any type of signal, e.g., analog, digital, single channel, composite, etc. and may also include audio or other data. The detection and replacement system 102 receives the input video signal 100 and identifies advertisements (the process of identifying will be described below in more detail). When an advertisement is identified, the advertisement can be replaced with a replacement advertisement.

The detection and replacement system 102 outputs an output video signal 104 which contains the modified video with the replacement advertisements. During a non-advertisement portion of the video then, the output video signal 104 should typically be the same as, or very similar to, the input video signal 100.

In a first embodiment of the present invention, detection and replacement of advertisements is performed locally and automatically. Local detection is where detection of advertisements is performed by hardware in a same physical location or building as the output device or replacement device. Automatic detection is detection performed automatically by electronic equipment.

FIG. 2 is a block diagram representing a user relationship, according to an embodiment of the present invention.

FIG. 2 illustrates a user relationship in which a broadcaster 200 transmits programming from a broadcaster uplink facility 202 through a satellite 204. Signals transmitted by the broadcaster 200 can be received by a plurality of locations, including a pub 206 run by pub owner 208 or a hotel 210 operated by hotel operator 212. Although two types of commercial establishments are illustrated, the invention is not limited to those commercial establishments nor is it limited only to commercial establishments. The invention can also be deployed for use in a residential environment.

Although transmission of processing has been illustrated in FIG. 2 by way of satellite 204, other systems of transmission can be utilized including but not limited to cable transmission, digital subscriber line (DSL) transmission, over-the-air broadcasts, and other wireless or wired means of transmission.

Referring again to FIG. 2, advertiser 214 has a number of advertisements stored on advertiser databases 216. Advertiser 214 may be a manufacturer, advertising agency, or any other entity or individual interested in advertising. Ad reseller 218 utilizes an ad reselling management unit 220 to take the advertisements from advertiser databases 216 and transmit them over network 222 to commercial establishments such as pub 206 or hotel 210. In one embodiment advertiser reseller 218 works with advertiser 214 and the commercial establishments to sell the advertising opportunities created by the ad substitution process. Network 222 may comprise a private or public network such as the Internet, or may be another network infrastructure that provides connectivity between the various elements illustrated in FIG. 2. In the embodiment illustrated in FIG. 2, ads are transmitted from advertiser databases 216 to ad reselling management unit 220 over network 222. In an alternate embodiment the ads are sent directly from advertiser databases 216 to ad reselling management unit 220 over a connection between the two units. As illustrated in FIG. 2, connectivity can be provided between the content provider (e.g. Broadcast uplink facility 202) and the network 222. Such connectivity can be useful for the transmission of advertisements, commercial break intros/outros, or fingerprints of advertisements or commercial break intros/outros. The ad reseller 218 utilizing the ad reselling management unit 220 enables the substitution of ads to occur during the commercial breaks, thus providing new advertising to viewers in pub 206 or hotel 210.

Figure 3:
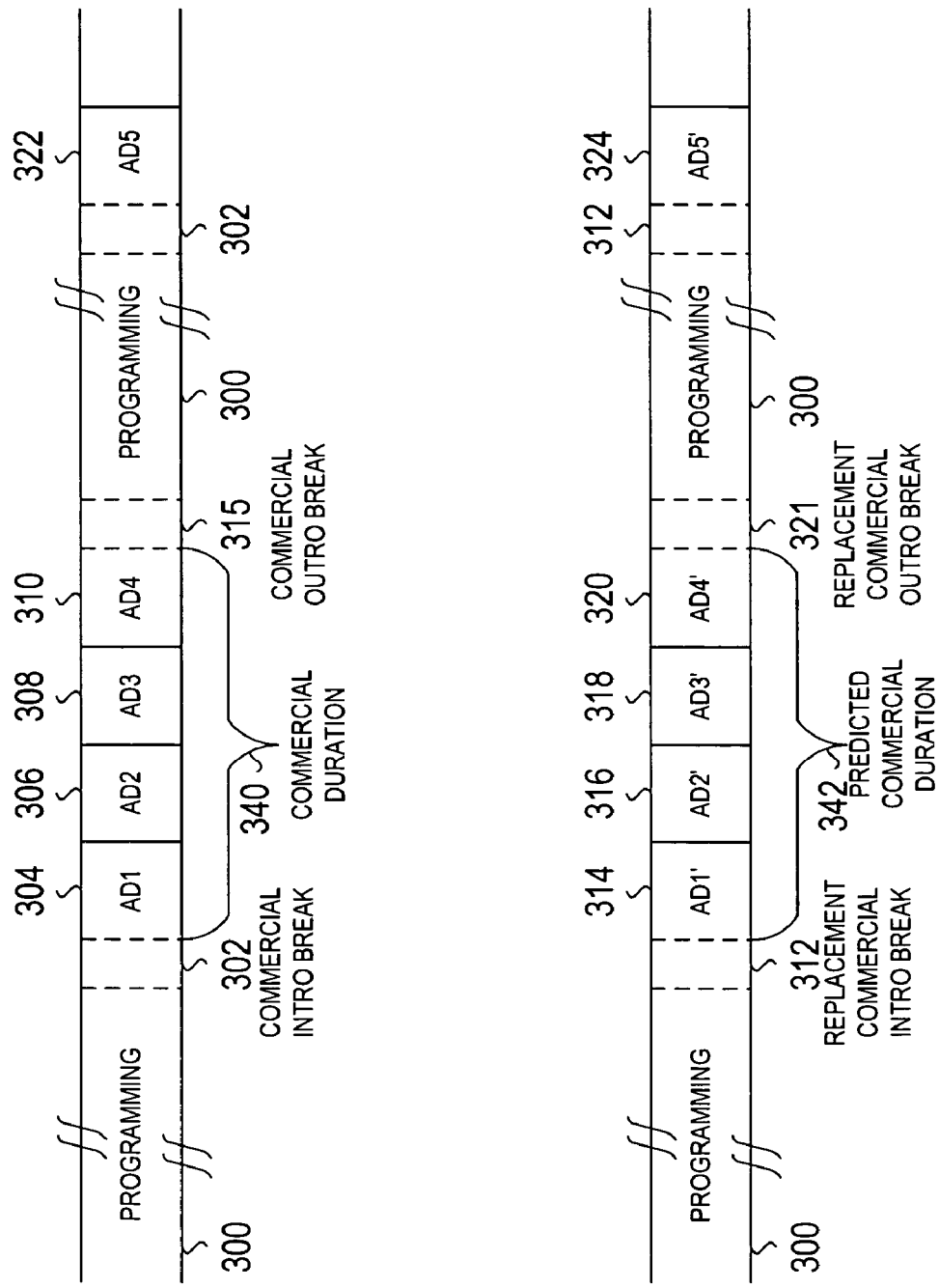
FIG. 3 is a time-frame diagram representing a programming stream with initial and substituted advertisements, according to an embodiment of the present invention.

FIG. 3 is a time-frame diagram representing a programming stream with initial and substituted advertisements, according to an embodiment of the present invention.

Programming 300 progresses into a commercial break intro 302. Commercial break intros are utilized in a number of countries to indicate to the viewers that the subsequent material being presented is not programming but rather sponsored advertising. These commercial break intros vary in nature but may include certain logos, characters, or other specific video and audio messages to indicate that the subsequent material is not programming but rather advertising. Subsequent to commercial break intro 302 a number of ads appear and as illustrated in FIG. 3 are presented as AD1 304, AD2 306, AD3 308, and AD4 310. The number of ads shown in FIG. 3 is merely illustrative, and any number of ads may in fact occur. The sequence of ads comprises commercial duration 340 and subsequently a return to programming 300. The return to programming may in some instances be preceded by a commercial break outro 315 which is a short video segment that indicates the return to programming. Another commercial break intro 302 can subsequently appear, followed by more ads such as AD5 322.

Referring to the lower half of FIG. 3, it can be seen that a replacement commercial break intro 312 can be substituted followed by the substitution of advertisements including substituted ads AD1' 314, AD2' 316, AD3' 318, AD4' 320. This is followed by a return to programming 300 and can be followed by a replacement commercial break intro 312 and another ad such as AD5' 324. In an alternate embodiment, there is no replacement commercial break intro 312 and the initial commercial break is used. In another embodiment the commercial break intro 302 is deleted entirely.

In an alternate embodiment substituted ads are not motion video but are instead still images. This embodiment has the advantage that a return to programming can occur after a time period that is not a multiple of 15 seconds (e.g., 30 seconds or 60 seconds), such that none of the original programming is lost.

In one embodiment the replacement commercial break intro 312 is explicit in describing that the advertising that follows is not part of the original programming. In some instances the particular establishment may take credit for the substituted advertising. In another embodiment a replacement commercial break outro 321 is utilized to indicate a return to original programming.

Figure 4:
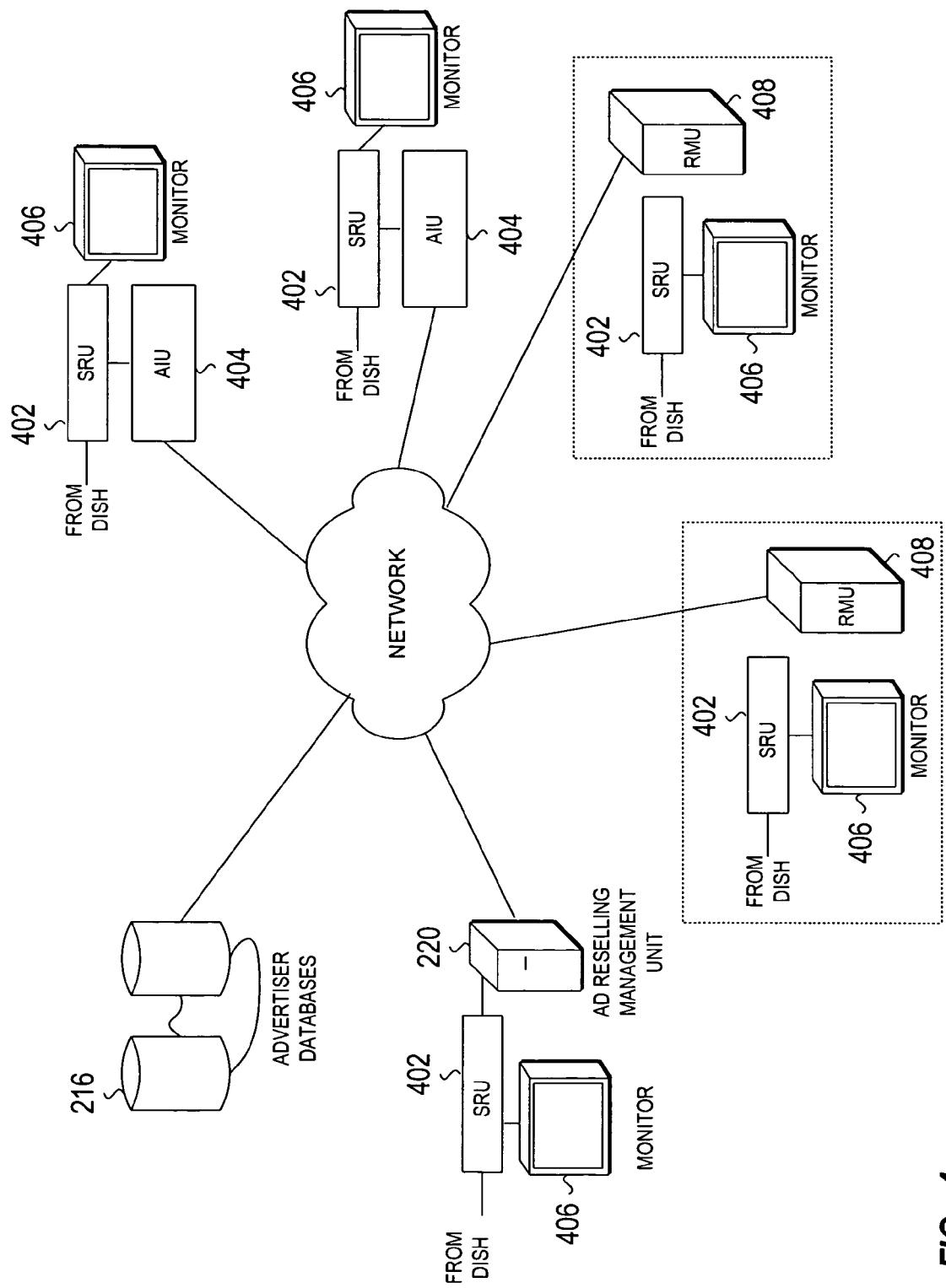
FIG. 4 is a block diagram representing a network of one embodiment of the system, according to an embodiment of the present invention.

FIG. 4 is a block diagram representing a network of one embodiment of the system, according to an embodiment of the present invention.

The system can be deployed over a network in which advertiser databases 216 communicate, under the control of ad reselling management unit 220, with ad insertion units 404. The ad insertion units 404 receive programming signals from a satellite reception unit 402. Ad insertion unit 404 displays that programming and advertisements included with the programming on monitor 406. Monitor 406 is typically a television (CRT, plasma, projection, or any other type of television), although the monitor may be a computer, computer display, or other type of video terminal. Although the reception unit is shown in FIG. 4 to be a satellite reception unit 402, the invention is not constrained to satellite reception but may receive signals from any number of sources as previously discussed.

Ad reselling management unit 220 is typically utilized with a satellite reception unit 402 and a monitor 406 to observe the original programming stream.

As will be discussed in greater detail, fingerprinting systems are used in one embodiment to detect the presence of a commercial break intro 302 at ad insertion unit 404, and to initiate the substitution of advertisements.

In another embodiment remote monitoring units 408 are used in conjunction with a satellite reception unit 402 and monitor 406 such that an individual is viewing the programming and identifying the presence of commercial break intros 302. Upon seeing a commercial break intro 302 the individual presses a key or a button or other activation mechanism to send a signal through the network to ad reselling management unit 220 indicating that a commercial break intro 302 is taking place, and on what channel the commercial break is taking place. Ad reselling management unit 220 then can take a statistical average of the received indications of a commercial break intro 302 and can transmit that information to ad insertion units 404 causing ad substitution to take place. In this embodiment commercial break intro 302 and commercial break outro 315 are determined by voting and statistical measures, thus eliminating the need for automatic detection at the ad insertion unit 404. The number of ad insertion units 404 and/or remote monitoring units 408 and associated equipment shown in FIG. 4 is merely illustrative, and any number of such devices may be in communication with the network.

Manual commercial break intro detection can be implemented as a simple office-based group of well trained and well paid viewers, or as a robust network of home-based, low-paid viewers in a scenario similar to that used by real-time closed-caption providers. In this embodiment, home-based viewers are equipped with networked remote monitoring units 408 that are equipped with hand-held remotes or other data entry device, used by these viewers to indicate when a commercial break commenced and concluded. These indications, along with the channel being viewed, would be collected and processed by the ad reselling management unit 220 (using a voting scheme to sort out the false or slow indications) and distributed to the ad insertion units 404. Manual advertisement detection will be discussed below in more detail.

The distribution of the commercial break detection information and advertisement cue tones can be accomplished using either a public distribution network (the Internet, for example) or a private network of leased facilities. The choice of a public or private network is typically based on a cost/reliability trade-off analysis. The key parameters to be managed in the network distribution of detection data are latency and packet loss. The latency of a typical packet on the public Internet, within a country or continent, is virtually always well under one second. Packet loss, however, is not as predictable. Most core providers claim fairly low packet loss rates (well under 1%), but overall statistics show packet loss in the 1% to 5% range is not unusual. Because packet loss can be so high, some form of reliable (guaranteed) delivery must be used. The Transport Control Protocol (TCP) is the most common mechanism for guaranteed delivery used on the Internet, but involves the use of acknowledgements and retransmission of packet sequences. Alternative forms of reliable transport can be utilized to ensure both high reliability and low latency. The transport infrastructure need not be wired. Mobile wireless, or satellite radio frequency distribution mechanisms can be used for the transmission of commercial break information and cue tones.

Figure 5:
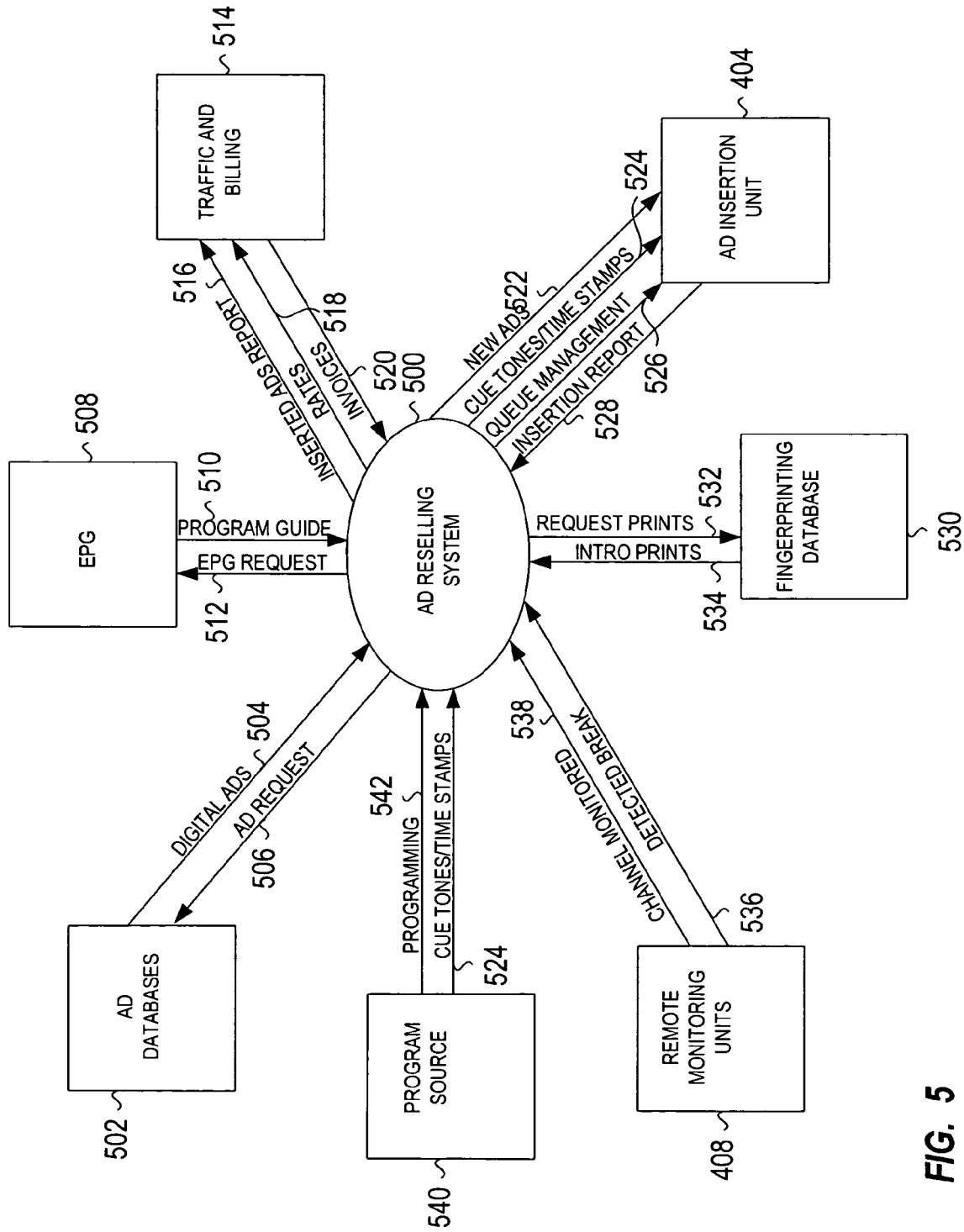
FIG. 5 is a block diagram illustrating an ad reselling system, according to an embodiment of the present invention.

FIG. 5 is a block diagram illustrating an ad reselling system, according to an embodiment of the present invention.

An ad reselling system 500 works with ad databases 502 which can be contained within the advertiser databases 216. The ad reselling system 500 makes an ad request 506 and receives digital ads 504. Programming source 540 transmits programming 542 to the ad reselling system 500 and in some cases may transmit cue tones/timestamps 524 which indicate the point of insertion for advertisements as well as the return to programming.

In some embodiments one or more remote monitoring units 408 are present and transmit signals including channel monitored 538 and detected break 536 to ad reselling system 500 such that the ad reselling system 500 can generate in its own cue tones/time stamps 524.

In another embodiment a fingerprinting database 530 is used to store fingerprints of the ads 304-310 (or other replaceable segments) and commercial break intros 302. The ad reselling system 500 generates a request prints signal 532 and receives ad and intro prints 534. The ad and intro prints 534 provide material describing the ads and commercial break intros 302 such that the ad reselling system 500 can generate cue tones when a match is detected in the programming 542. Fingerprints will be discussed below in more detail.

Ad insertion unit 404 receives cue tones/timestamps 524 which have been produced either through the program source 540 or by ad reselling system 500 in conjunction with signals from remote monitoring units 408, or generates cue tones/timestamps locally through correlation of locally held intro and ad prints 534 with received programming 542. Queue management signals 526 indicate which ads are to be substituted into the programming stream. New ads 522 are received by ad insertion unit 404 and are typically the 15, 30 or 60 second commercials that are to be substituted, although the invention is not limited to those particular durations of advertisements.

In an alternate embodiment, ad insertion unit 404 generates cue tones/timestamps 524 locally through the correlation of locally stored fingerprints of commercial break intros and ads with incoming frames of video, and in some cases of correlation of audio fingerprints with the audio stream. In one embodiment these fingerprints are generated locally at the ad insertion unit 404, while in an alternate embodiment they are transmitted from ad reselling system 500 along with new ads 522.

Ad reselling system 500 also interfaces with a traffic and billing system 514 such that traffic and billing system 514 receives an inserted ads report 516 and rates 518, and can generate invoices 520. Third parties can pay the operator of the ad reselling system 500 for using the third parties' advertisements as replacement advertisements.

In one embodiment the ad reselling system 500 interfaces with an electronic programming guide (EPG) 508 such that EPG request 512 is generated by ad reselling system 500. EPG 508 presents a program guide 510 to ad reselling system 500. This program guide 510 can be utilized by the ad reselling system 500 to determine the appropriate times for the insertion of advertisements as well as to determine the types of programming that are being presented at a particular time of day.

Figure 6:
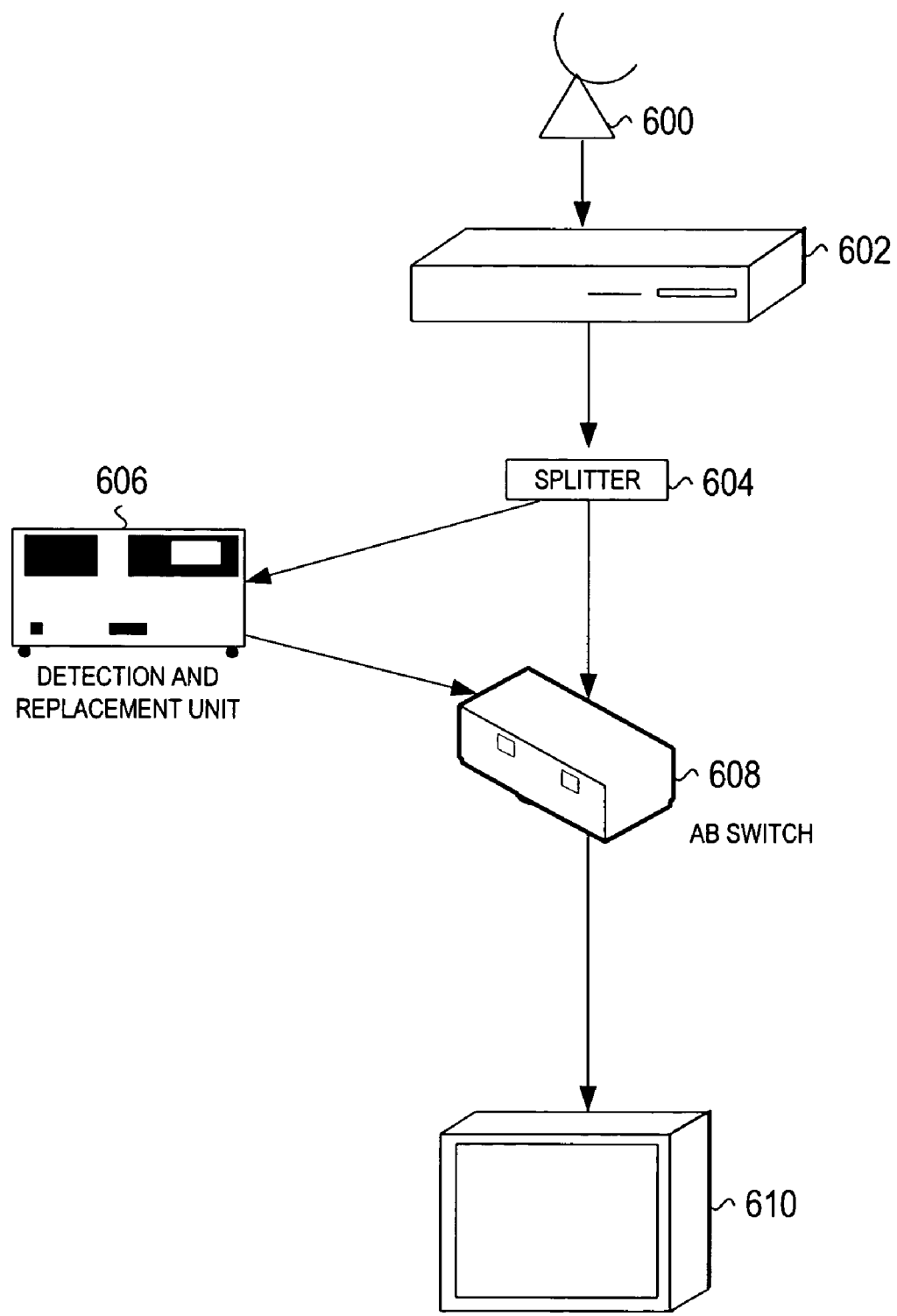
FIG. 6 is a block diagram illustrating an example of a local configuration of the present invention, according to an embodiment of the present invention.

FIG. 6 is a block diagram illustrating an example of a local configuration of the present invention, according to an embodiment of the present invention.

A receiving dish 600 (or any other receiving apparatus such as a land line cable, etc.) receives a video signal. The video signal is transmitted to a set top box 602 (a tuner). The set top box 602 is tuned to a desired channel by an operator and outputs a channel output to a splitter 604. The splitter 604 splits the channel output to a detection/replacement device 606 and a selector 608.

The selector 608 receives a signal from the detection/replacement device 606 and the splitter 604, and can select which signal to output to an output device 610. The selector 608 can be controlled manually by an operator and/or can be under the control of other components of the system such as the detection/replacement unit 606 and/or the set top box 602.

The detection/replacement device 606 automatically detects a presence of an advertisement (or other segment to be removed), and automatically replaces the advertisement with a replacement portion (typically a targeted advertisement).

The replacing is done by initiating a playback of the replacement portion (such as an MPEG playback), and controlling the selector 608 to select output from the detection/replacement device 606 as opposed selecting output from the splitter 604. When the playback of the replacement segment(s) is over, and it is time to return to the content on the channel output, the detection/replacement device then controls the selector to switch back to output from the splitter 604.

Note that the splitter 604 and selector 608 may all be contained inside the detection/replacement device 606 itself. Additionally, the splitter 604 and selector 608 can be used as a bypass circuit in case of an operations issue or problem. For example, in case of any problem with the detection/replacement device 606 or operation, in this embodiment or any others described herein, the selector 608 can automatically select the output from the splitter 604. In this manner, a signal is never lost, and at worst, the output device 610 will display video content with the original advertisements intact. An operations issue might be failure of hardware, failure to receive trigger signals or any other reason the system may not be operating as intended.

Note that in FIG. 6 all cables/signals can also include separate audio cables/signals in addition to video cables/signals.

The automatic detection of advertisements, and other segments, can be performed using numerous techniques known in the art, see R. Lienhart, C. Kuhmunch and W. Effelsberg, "On the detection and recognition of television commercials," Proc. IEEE Int. Conf. Multimedia Computing and Syst. (1997), which is incorporated by reference herein. Such techniques include detection of black frames, detection of scene changes, or detection of particular aspects of the image. Such aspects can include color histograms and color coherence vectors.

Comparison of entire frames of video sequences can be computationally intensive. It is more efficient, and in some cases more effective, to reduce the data before storage and comparison. The reduced set of data for a video segment is sometimes called a fingerprint.

Fingerprints of each commercial can be created by calculating important features for each frame and then representing the spot's fingerprint as a sequence of these features. Fingerprint matching should tolerate small differences between two fingerprints calculated from the same spot, but broadcasted at different times or via different paths. Matches should be computationally inexpensive and should show strong discriminative power.

A best mode of fingerprint data is the color coherence vector (CCV). CCVs are fast to calculate, show strong discriminative power and tolerate slight color inaccuracies. The generation of CCV fingerprints to describe video content is described in "On the Detection and Recognition of Television Commercials" article mentioned previously.

The color coherence vector (CCV) is related to the color histogram, but instead of counting only the number of pixels of a certain color, it differentiates between pixels of the same color depending on the size of the color region they belong to. If the region is larger than a specified size, a pixel is regarded as coherent. Otherwise, it is regarded as incoherent. One possible region size is 25 pixels.

Thus, there are two values associated with each possible color: the number of coherent pixels of that color and the number of incoherent pixels of that color. A color coherence vector then is defined as a vector of these values. The size of the vector can be reduced by reducing the number of colors. One method for color reduction is the use of only the two highest order bits of each color plane. Further data reduction can be achieved by scaling the image before calculating the CCV, for example, to 240×160 pixels. Smoothing with a Gaussian filter can also improve matching performance.

Video segments can be detected by matching their fingerprints to fingerprints stored in a database. The representation of the value of a feature can be called a character, the domain of possible values an alphabet, and the sequence of characters a string. Given a query string A of length P and a longer subject string B of length N, the approximate substring matching finds the substring of B that aligns with A with minimal substitutions, deletions and insertions of characters. The minimal number of substitutions, deletions and insertions transforming A into B is called the minimal distance D between A and B.

Two fingerprint sequences A and B are regarded as a match if the minimal distance D between query string A and subject string B does not exceed a distance threshold and the difference in length does not exceed a length difference threshold. Approximate substring matching allows detection of commercials that have been slightly shortened or lengthened, or whose color characteristics have been affected by different modes or quality of transmission. One possible substring matching algorithm is that proposed in "Pattern Matching in a Digitized Image," G. M. Landau and U. Vishkin, Algorithmica 12(4/5) 375-408, October 1994.

A sliding window of length L seconds runs over the video, calculating the CCV fingerprint of the window. At each position the window fingerprint is compared with the first L+S seconds of each fingerprint stored in the database. If two are similar, the window is temporally expanded to the whole length of the candidate fingerprint in the database and the two are compared. If a video segment is recognized, the window jumps to the end of that commercial, otherwise it only shifts forward to the next shot boundary. The subject string is initially set to length L+S to avoid an increase of the approximate distance by frames dropped at the start of the commercial, which might occur in practice. S should be set as low as possible, with 2 seconds being a possible value.

One application of video segment detection is the detection of advertising blocks for replacement. The system operator can create a database of advertisements.

In some European and Asian countries, commercial blocks are bounded by "outro" and "intro" video segments. These segments announce to the viewer that a commercial segment is beginning or ending, and generally contain some indication of the identity of the broadcaster or program provider. When such segments are dependably available, specific detection of every commercial may not be necessary. The system can switch to alternate content when an "outro" is detected and back to programming when an "intro" is detected.

Color coherence vectors have the advantage that they capture spatial information on which to base a decision regarding the presence of a particular segment. That decision can be made based on a comparison of the color coherence vectors for the incoming image vs. the color coherence vectors stored in the fingerprints of known segments for detection.

Calculation of the color coherence vectors is described in the article entitled "Comparing Images Using Color Coherence Vectors," by Greg Pass, Ramin Zabih, and Justin Miller, In Proceedings of ACM Multimedia 96, pages 65-73, Boston, Mass. USA, 1996, which is incorporated by reference herein. The color coherence vectors can be calculated and compared for 25 (or any number) of frames of incoming video to determine if those color coherence vectors match the stored fingerprints containing color coherence vectors of stored segments. If a match is detected, the comparison can be expanded in time to insure a lower probability of error.

In order to facilitate automatic detection using fingerprint data, it is desirable that a current library of fingerprint data for advertisements (or other segments) be accessible by the detection/replacement device 606. In a further embodiment of the present invention, a local fingerprint database can be maintained with periodic (or instantaneous) updates from a remote fingerprint server.

Figure 7:
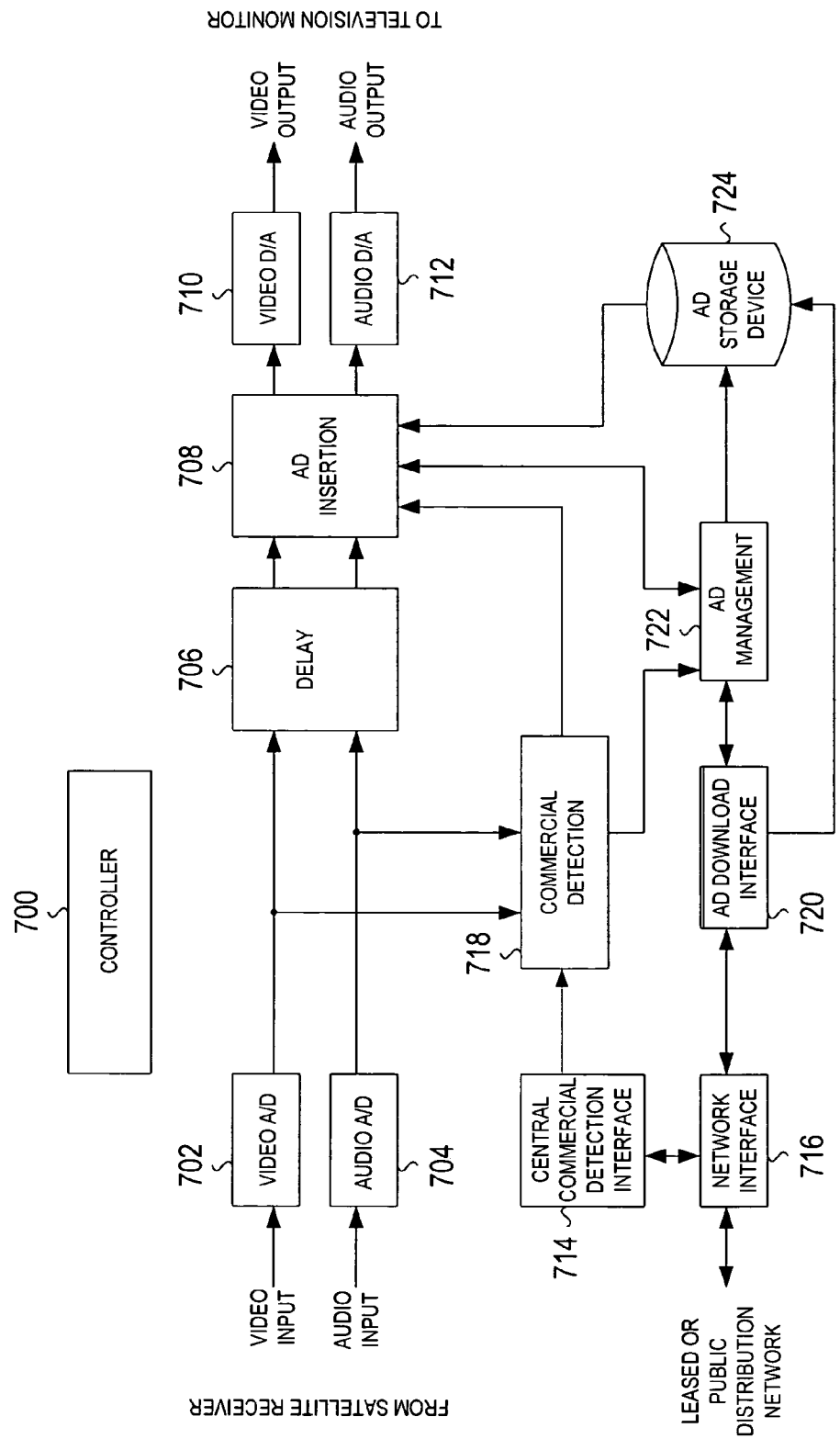
FIG. 7 is a block diagram illustrating an example of an ad insertion unit, according to an embodiment of the present invention.

FIG. 7 is a block diagram illustrating an example of an ad insertion unit, according to an embodiment of the present invention.

FIG. 7 illustrates an ad insertion unit 404 and includes a video A/D converter 702, and audio A/D converter 704, both interfacing to a commercial detection function 718, an ad management function 722, an ad download interface 720, a network interface 716 and a central commercial detection interface 714. The system also includes delay element 706 and an ad insertion function 708. Delay element 706 is required in some embodiments to enable the proper detection and substitution of commercial messages. This delay, if required, is typically in the range of 2 to 60 seconds, although some embodiments will allow for the use of minimal delay on the order of milliseconds. The ad insertion function 708 is connected to the commercial detection function 718, the ad management function 722 and an ad storage device 724. In one embodiment the ad insertion function 708 is a digital ad insertion unit that causes splicing to occur as per industry standards for digital video streams. In this embodiment the commercial detection function 718 is accomplished using one or more fingerprint recognition methods implemented in software running on a microprocessor or specialized circuit. Ad management function 722 can be accomplished using a microprocessor, and the ad storage device 724 can be a hard drive. Alternate embodiments using different types of hardware or hardware in conjunction with software are possible.

In one embodiment ad insertion unit 404 operates in live mode, with the delay being relatively unnoticeable to the viewer. In an alternate embodiment, ad insertion unit 404 operates in playback mode in which case the programming is being played back with a time shift ranging from tens of minutes to weeks or even months and years. In yet another embodiment the delay is on the order of a few seconds to a few minutes, thus allowing more time for the detection of the commercial break intro 302, the advertisements, or the return to programming. Playback mode can be utilized as part of a Video on Demand system, and when implemented in a hospital or hotel will allow the generation of significant revenue from the targeting of advertisements. More on the time delay will be discussed below in more detail.

Ad storage device 724 can be based on semiconductor memory (e.g. DRAM or Flash) or hard disk drive used for the storage of ads for substitution. In an alternate embodiment optical storage is utilized for ad storage device 724. The ad audio and video is stored in compressed format (MPEG-2, for example) to allow tens to hundreds of ads to be stored in a very modest sized memory or disk drive (60 Mbytes to 10 Gbytes). Ad insertion function 708 also interfaces to a video D/A 710 and audio D/A 712.

The ad insertion function 708 prepares a stored ad (from the ad storage device 724) for insertion by decompressing it, and inserts it into the program on cues provided by the commercial detection function 718. The ad management function 722 keeps track of all of the ads stored in ad storage device 724 and selects appropriate ads when requested by the commercial detection function 718. The ad management function 722 keeps an internal database of which ads are stored on ad storage device 724 and when and how they should be inserted (the ad insertion schedule). The ad management function 722 also keeps track of which ads were actually played and communicates with the traffic and billing 514. Ad management function 722 also insures that all of the necessary advertisements are on ad storage device 724, and can request additional advertisements as required.

Network interface 716 provides a single point of connection between the ad insertion unit 404 and a public or private (leased) distribution network. The network is used to download ads, correspond with a traffic and billing system, and communicate commercial break information (if required).

Ad download interface 720 provides the functionality necessary to download ads and store them on ad storage device 724. Ad download interface 724 communicates with ad management function 722 to update the ad management function's ad database.

Central commercial detection interface 714 receives messages from a central location where commercials are manually or automatically detected and messages sent to all ad insertion units. In an alternate embodiment, commercial detection function 718 is in a central location and a signal sent to all boxes indicating the timing of commercial breaks.

In operation and as can be seen from FIG. 7, video and audio is received by the ad insertion unit 404 and commercial break intros 302 are detected in the commercial detection function 718. Once the commercial intros are detected, the ad management function 722 retrieves an ad from ad storage device 724 and causes it to be inserted in ad insertion fuinction 708. Delay 706 is present such that additional time can be given to the commercial detection process taking place in commercial detection function 718 such that the commercial break intro 302 can be appropriately identified. Upon completion of the commercials, according to the predicted or known commercial duration 342 ad insertion operation 708 ceases to insert ads and returns to the original programming received at the video and audio output but including the delay 706. Video and Audio D/A converters 710 and 712 respectively recreate the analog signals that are expected at the back of most television viewing devices. Although in one embodiment analog signals are utilized, the system can be used in a purely digital environment with digital signals being received and transmitted directly to the viewing device. In another embodiment, digital signals are received and analog signals are presented to the television or viewing device. One advantage of this embodiment is that the ad insertion unit 708 can also act as a receiver for digital signals. This embodiment is particularly useful for the viewing of digital over-the-air transmissions on traditional analog televisions.

Figure 8:
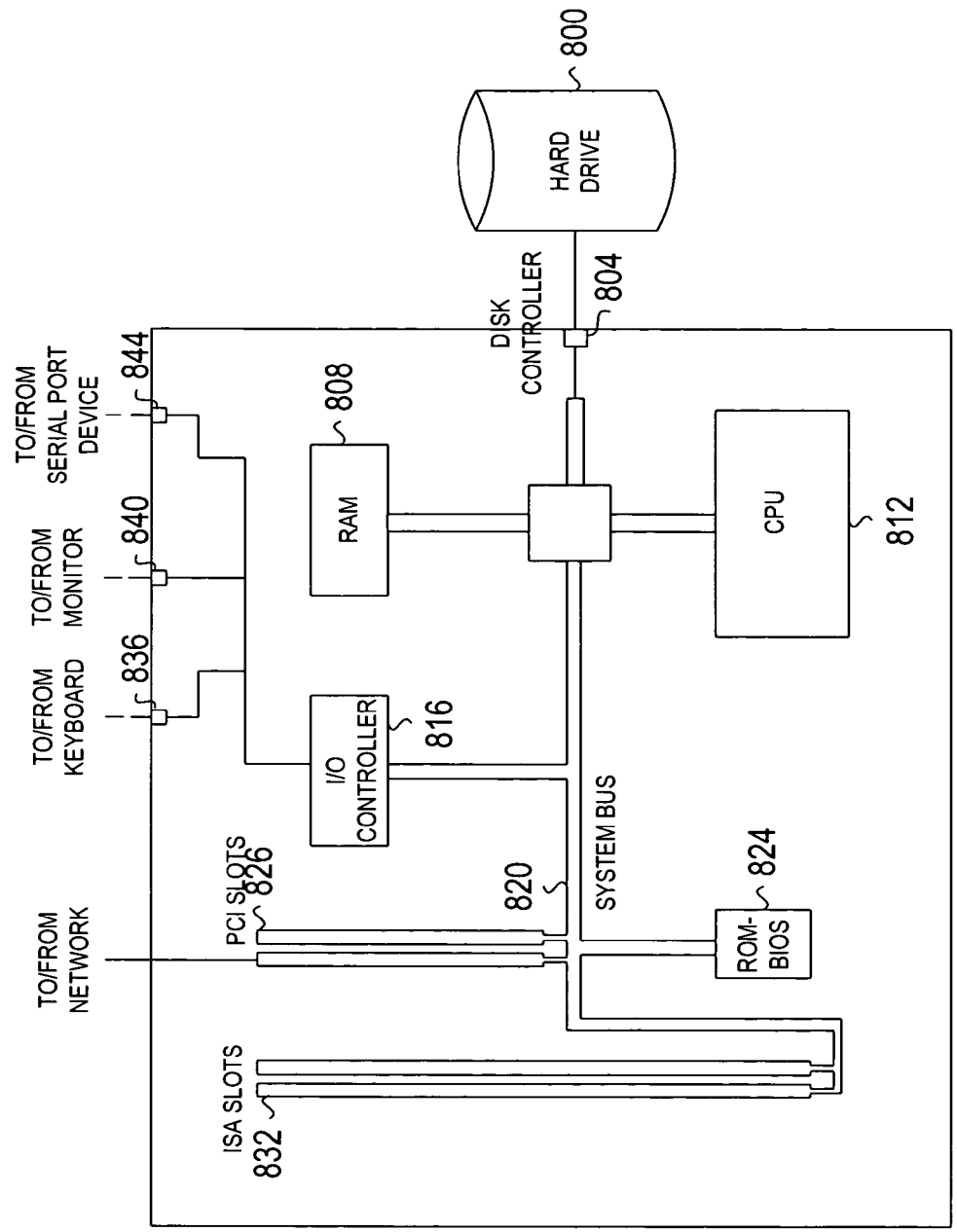
FIG. 8 is a block diagram illustrating a computer implementing an ad reselling system, according to an embodiment of the present invention.

Controller 700 acts to coordinate the operations of the various units of the ad insertion unit 404, and can be based on a traditional micro controller or personal computer as illustrated in FIG. 8.

FIG. 8 is a block diagram illustrating a computer implementing an ad reselling system, according to an embodiment of the present invention.

FIG. 8 represents a computer on which specific embodiments of the invention can be implemented to create ad insertion unit 404, remote monitoring unit 408, or ad reselling unit management unit 220. A system bus 820 transports data among the CPU 812, the RAM 808, Read Only Memory-Basic Input Output System (ROM-BIOS) 824 and other components. The CPU 812 accesses a hard drive 800 through a disk controller 804. The standard input/output devices are connected to the system bus 820 through the I/O controller 816. A keyboard is attached to the I/O controller 816 through a keyboard port 836 and the monitor is connected through a monitor port 840. The serial port device uses a serial port 844 to communicate with the I/O controller 816. Industry Standard Architecture (ISA) expansion slots 832 and Peripheral Component Interconnect (PCI) expansion slots 826 allow additional cards to be placed into the computer. In an embodiment, a network card is available to interface a local area, wide area, or other network.

Figure 9:
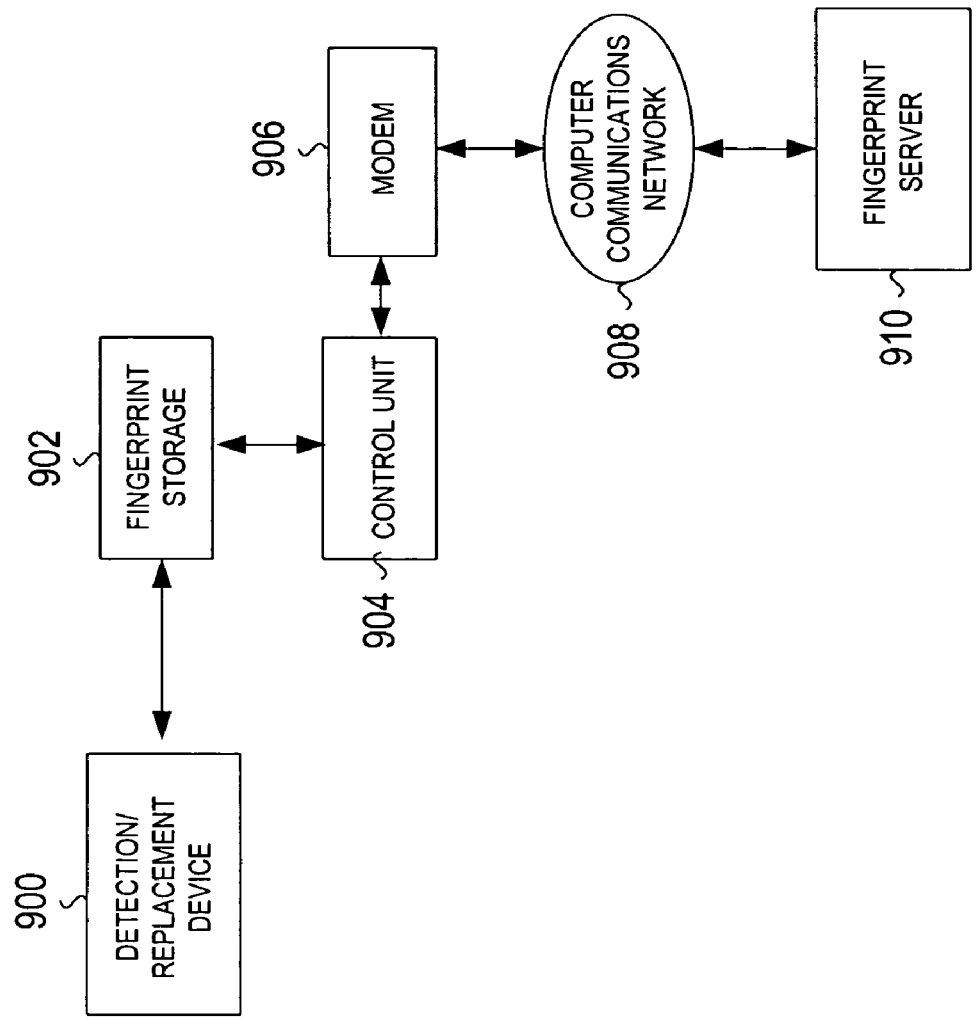
FIG. 9 is a block diagram illustrating an example of a fingerprint data maintenance apparatus, according to an embodiment of the present invention.

FIG. 9 is a block diagram illustrating an example of a fingerprint data maintenance apparatus, according to an embodiment of the present invention.

A detection/replacement device 900 is connected to a fingerprint storage 902. The fingerprint storage 902 is a storage device that stores any kind of fingerprint data relevant to the detection of advertisements, or other segments, as known in the art and is accessed by the detection/replacement device 900 when performing the detection of segments.

A control unit 904 is used to maintain the fingerprint storage 902. The control unit 904 interfaces with a modem 906 which is connected to a computer communications network 908 such as the Internet. The control unit 904 controls downloads of fingerprint data via the modem 906 and stores the data on the fingerprint storage 902. The control unit 904, as well as the fingerprint storage 902 and the modem 906, may physically exist as part of the detection/replacement device 900 or may exist as a separate component. A remote fingerprint server 910 transmits fingerprint data through the computer communications network 908 to the control unit 904, via the modem 906, which then gets stored in the fingerprint storage 902.

Fingerprint data can be transmitted upon request by the control unit 904, and/or additional fingerprint data can be transmitted automatically and periodically to the control unit 904. Additional fingerprint data can be instantly transmitted to the control unit 904 when it is available by the fingerprint server 910, or new fingerprints can be transmitted periodically (e.g., every week). The control unit 904 can be configured to receive fingerprint data from the fingerprint server 910 without requesting fingerprint data, for example by receiving the fingerprint data via email (or similar system) with automatic processing.

Using the previously described configurations, the detection/replacement device 900 has access to a current library of fingerprint data. The fingerprint server 910 would ideally store fingerprint data for all known advertisements, or other desired segments. When a new advertisement is known, the fingerprint server 910 can run, or use another apparatus to run, an analysis on the advertisement to calculate fingerprint data for that advertisement, and then store the new fingerprint data on the server 910. The new data can immediately be transmitted to recipients and their respective fingerprint storage 902, or can be saved for later transmission. The recipients can pay for the privilege of receiving current fingerprint data or the service can be provided for free or part of a package for use with the detection/replacement system.

Figure 10:
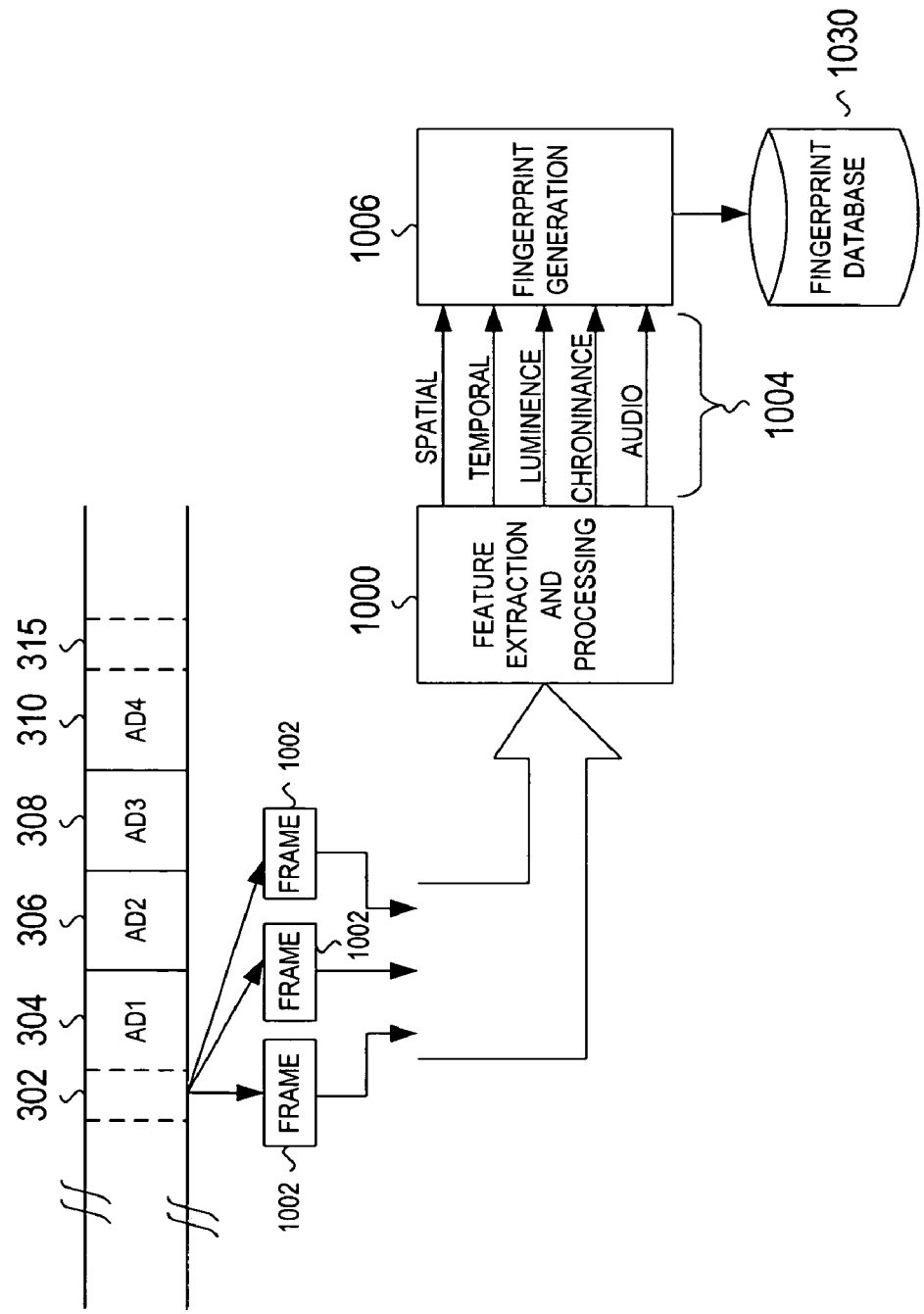
FIG. 10 is a block diagram illustrating a fingerprint database creation system, according to an embodiment of the present invention.

FIG. 10 is a block diagram illustrating a fingerprint database creation system, according to an embodiment of the present invention.

FIG. 10 describes a fingerprinting apparatus/process in which either commercial break intros 302 and/or ads such as 304 & 306 are digitized and a number of frames 1002 are received by a feature extraction and processing block 1000. This feature extraction and processing block 1000 performs a number of image processing operations to generate image and audio related elements 1004 such that a fingerprint can be generated by the fingerprint generation block, 1006. This fingerprint is a unique representation of a frame or set of frames, and can be used to identify a particular point in a video and audio stream. In one embodiment a fingerprint is comprised of important features of a frame.

An example of a simple feature that can be used as a fingerprint is the color coherence vector (CCV). The color coherence vector looks for areas in the frame having the same color. Other features of a frame can be used to create a fingerprint and include, but are not limited to, text and object recognition, logo or other graphic overlay recognition, and unique spatial frequencies or patterns of spatial frequencies. Fingerprints can also be created from multiple frames such that they include unique temporal characteristics instead of, or in addition to, the unique spatial characteristics. Temporal characteristics that can be used to create fingerprints can include hard cuts and hard cut frequency, fades, action, edge change ratio, and motion vector length. Other features of the commercial break intro 302 or advertisements (or other segments) can be used to form fingerprints including audio patterns and closed-caption text.

Although the generation of fingerprints has been described with respect to the commercial break intro 302, fingerprints can be generated for the advertisements themselves or for segments of the programming. The concept of fingerprinting is well known to those skilled in the art. Fingerprints are then stored in fingerprint database 530, and can be accessed to allow for comparison of the stored fingerprint with incoming frames of video.

A number of fingerprint generation techniques can be utilized such that appropriate information is extracted from the commercial break intro 302 or ad allowing recognition of that commercial break intro 302 or ad upon subsequent reception. In one embodiment, the recorded fingerprints do not contain sufficient information to recreate a copy of frames 1002 and thus it is impossible to reconstruct the commercial break intro 302 from the fingerprint. This effectively avoids copyright issues since the information stored can be used to recognize, but not reconstruct, the original copyrighted work.

As an alternative to fingerprints the detection of commercial break intro 302 can be performed by looking for features (directly or indirectly measurable) associated with the commercial break intro 302 or advertisements. These features can include, but are not limited to, black frames, changes in audio levels, frequency of hard cuts, fades, edge change ratio, motion vector length, and the presence of logos. In this embodiment no fingerprints are stored, but occurrence of the commercial break intro 302 is detected directly through identification of one or more features associated with the commercial break intro 302 or the advertisement.

Figure 11:
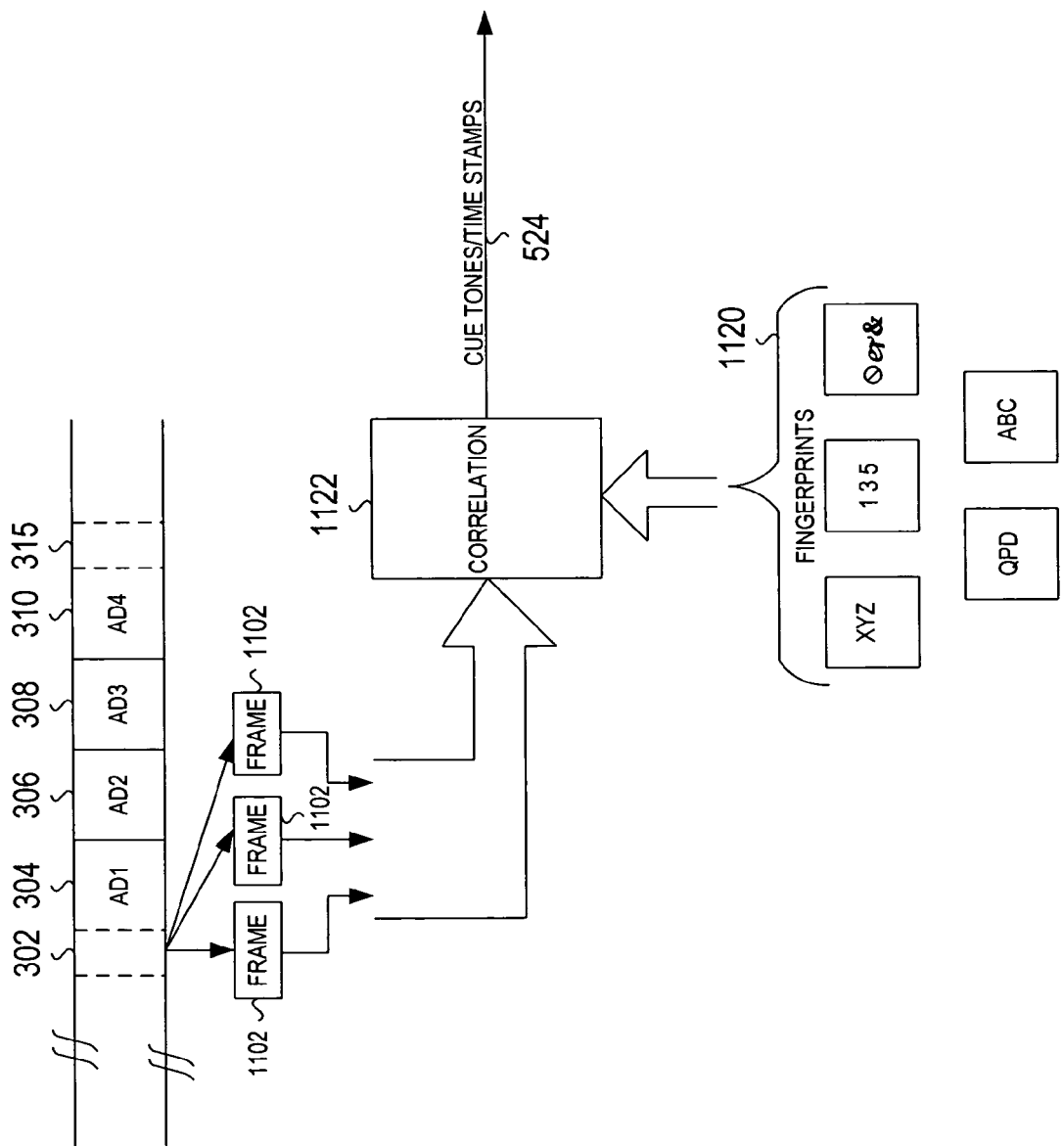
FIG. 11 is a block diagram illustrating a use of fingerprints in a correlation algorithm to generate cue tones or time stamps, according to an embodiment of the present invention.

FIG. 11 is a block diagram illustrating a use of fingerprints in a correlation algorithm to generate cue tones or time stamps, according to an embodiment of the present invention.

FIG. 11 illustrates a correlation process in which fingerprints 1120 are correlated with incoming frames 1102 in a correlation unit 1122 to generate cue tones/timestamps 524 (also known as a trigger signal) if a match is found. These cue tones/timestamps 524 are utilized by ad insertion unit 404 to commence the insertion of new advertising. The cue tones/timestamps 524 may include the current time, relevant channel, length of break, or any other information related to the detection.

The fingerprint generation and correlation apparatuses/processes illustrated in FIGS. 10 and 11 can be performed locally as well as at a central location, or can be distributed. In a distributed environment, fingerprint generation can take place centrally and the fingerprints distributed to the ad insertion unit 404, with correlation taking place at the ad insertion unit 404.

Figure 12:
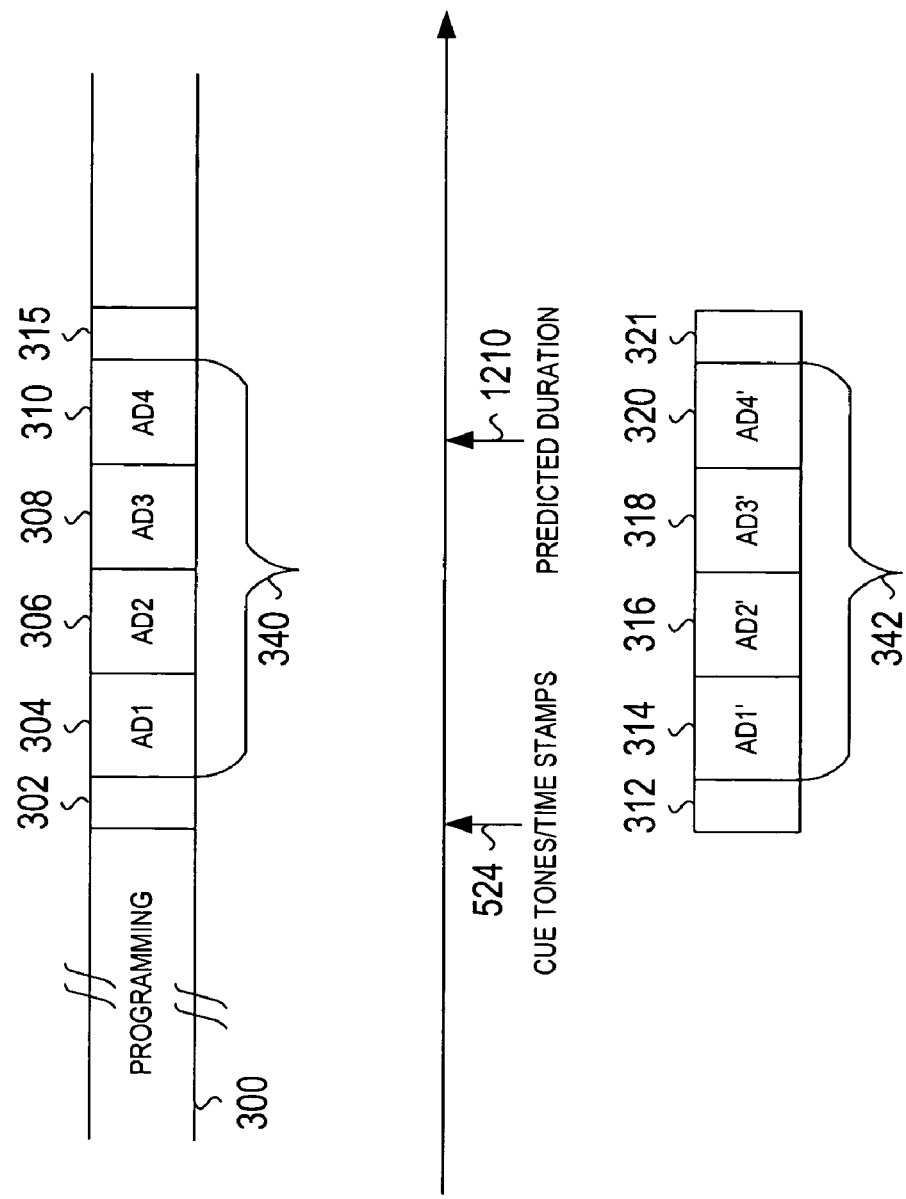
FIG. 12 is a time frame diagram representing a measurement of predicted duration of commercials, according to an embodiment of the present invention.

FIG. 12 is a time frame diagram representing a measurement of predicted duration of commercials, according to an embodiment of the present invention.

FIG. 12 illustrates the determination of the predicted duration 1210 from the programming 300 and original advertisements having a time span indicated as commercial duration 340. As can be seen in FIG. 12, a predicted duration 1210 is determined based on a number of statistical measures including measurements of the average number of advertisements presented during that type of programming, during that time of day, on that particular network or as measured through the use of remote monitoring units 408. These statistical measures can be applied to individual advertisements as well as to the entire commercial duration 340.

A database or other storage can store statistical measures and respective data, e. g., average length of break, average length of commercial, etc. So for example, data for Saturday at 4 pm can be stored which designated the average number of commercials is 3, or the average commercial length is 30 seconds, or the average length of an entire commercial break is one minute, etc. This data can be used for the predicting. Different statistical measures can be used and weighted according to predetermined weights.

Predicted duration 1210 can be used to determine the number of advertisements that should be substituted and thus determine the predicted commercial duration 342. In some instances the predicted commercial duration 342 will not match the commercial duration 340 exactly and one too few or one too many advertisements may be inserted into the stream. This is not critical to the invention, as failure to substitute a new advertisement will simply result in the transmission of the original advertisement. Alternatively, if an additional advertisement is inserted, some of the initial programming will be overridden but only for a period typically lasting 15 to 30 seconds. Because in general it is not desirable to overwrite the programming, the system can be designed such that predicted duration 1210 tends to err on the side of too few overridden commercials rather than too many. In an alternate embodiment, predicted duration 1210 is made based purely on a statistical measures and will in some cases, err in inserting too many commercials. In another embodiment, slides or still images are used for the advertising towards the end of the ad schedule so as to permit small durations (e.g., several seconds) of advertising between the end of a traditional 15, 30, or 60 second commercial and the return to programming. In some embodiments, the commercial duration 340 is known exactly and the substituted commercials fit in the commercial duration 340. In this embodiment, predicted commercial duration 342 is replaced by commercial duration 340.

In a further embodiment of the present invention, which can be used in combination with any of the other embodiments described herein, the substitute advertisements, or any other replacement segments, can be selected, maintained, and configured locally. For example, a local operator can choose advertisements to be used as replacements and he or she can even film or create their own custom advertisements. The advertisements can also be configured, such as specifying an order that they are used.

Figure 13:
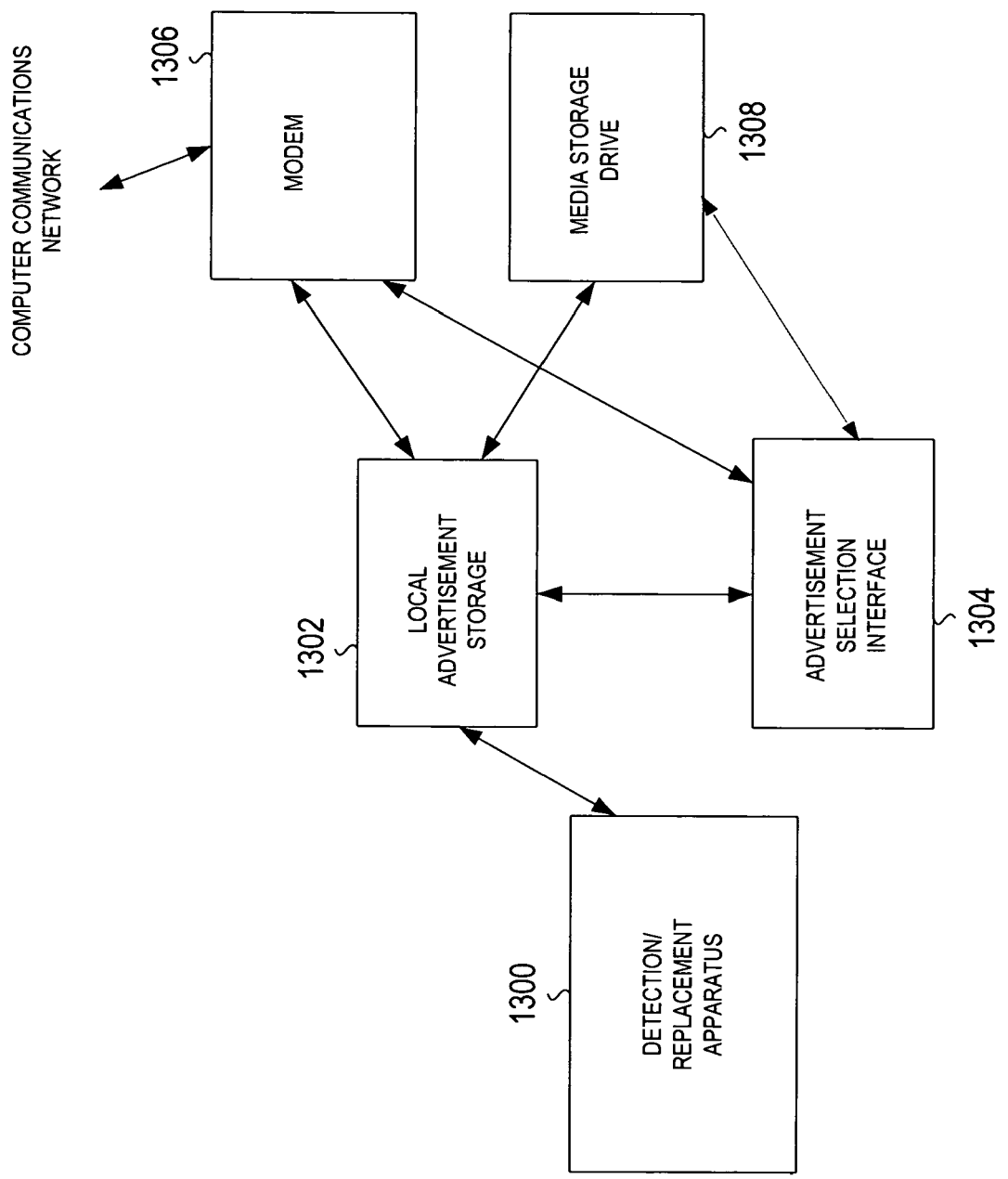
FIG. 13 is a block diagram illustrating a system for maintaining local replacement segments, according to an embodiment of the present invention.

FIG. 13 is a block diagram illustrating a system for maintaining local replacement segments, according to an embodiment of the present invention.

Detection/replacement apparatus 1300 is the apparatus described herein used for detection (the type of detection does not matter, e.g., automatic, manual, local, remote, etc.) The additional components described herein and their connections to the detection/replacement apparatus 1300 are not illustrated for simplicity.

The detection/replacement apparatus 1300 is connected to a local advertisement storage 1302, which corresponds to ad storage device 724. The local advertisement storage 1302 stores replacement advertisements and can comprise any kind of computer storage such as CD-ROM, DVD, flash memory, hard disk drive, etc.

An advertisement selection interface 1304 is a typically an optional software module running on a hardware device (either contained in the detection/replacement device 1300 or on a separate physical entity) that allows a local operator to select advertisements and configure them for use by the detection/replacement device as replacements.

The advertisement selection interface 1304 can interface with a modem 130 which allows an operator to browse and/or download advertisements from a server using a computer communications network. This can be the same modem used by the detection/replacement apparatus or a separate one. The server can have advertisements for purchase or for free that an operator may download, for example advertisements for beer (either beer in general or a particular brand), etc. The advertisement selection interface 1304 also interfaces with a media storage drive 1308 (such as a DVD drive, etc.) so that the operator can load in a DVD (or any other media) with advertisements the operator wishes to transfer to the local advertisement storage 1302.

The advertisement selection interface 1304 may use a graphical user interface (GUI) to allow the operator to easily download and/or select advertisements from the local advertisement storage 1302 so that the operator can decide which advertisements he wishes to transfer to the local advertisement storage 1302 for later use as replacement portions. The operator can also select the order in which the selected replacement portions will be displayed.

The local advertisement storage 1302 may optionally also store a length of each stored advertisement. This is so the detection/replacement device can utilize an advertisement of an appropriate length. For example, if a commercial break is known, predicted, or estimated to be 30 seconds, then a 30 second replacement portion may be used from the local advertisement storage 1302.

An advantage of using the configuration illustrated in FIG. 13 is that the operator of the equipment has the ability to easily tailor the advertising to his or her wishes. For example, if the detection/replacement device described herein is utilized in a pub, then the operator may wish to choose advertisements that are targeted directly to the publicans (for example, a type of beer or food). The operator should typically benefit from showing advertisements for products or services that the publicans can purchase and receive immediately. As another example, if the detection/replacement device described herein is used in a hospital (or airport, etc.), then the hospital may wish to advertise products or services that the hospital offers. Operators of the equipment would benefit from using advertisements for products they sell and services they offer.

Custom advertisements can also be made and transferred to the local advertisement storage 1302. Advertisements may even be as simple as a single video frame portraying a product. In this still frame embodiment, choosing an advertisement with a length which matches an estimated length of the commercial break is not required, and there is no concern that a replacement portion may be cut off prematurely when non-advertising programming returns to the channel being watched.

The automated detection embodiments described herein have the advantage that they require no human intervention. However, such methods may not be entirely foolproof and for a variety of reasons it is possible a segment desired for replacement may go undetected automatically. Thus, in alternate embodiments of the present invention, the manual detection mentioned previously is used to detect segments such as advertisements (in place or in conjunction with automated detection). Manual detection is where a human operator(s) is (are) used to detect segments (e.g., advertisements).

In one embodiment of the present invention, a local manual detection (as opposed to local automated detection) can be used to detect advertisements. For example, a local employee such as a bartender can watch an output device, and when he or she sees an advertisement (or other desired segment to be removed), the bartender can flip a switch (replacing the automatic detection described above), triggering output of a replacement segment. The bartender can watch another output device displaying the original video signal to determine when the advertisement is over, and then flip the switch back to return the original signal to the public output device.

In a further embodiment of the present invention, manual detection can be performed remotely and transmitted to the detection/replacement device. Remote manual detection is preferred to the local manual detection described above as no local human operator is needed to effectuate the remote embodiment.

Figure 14:
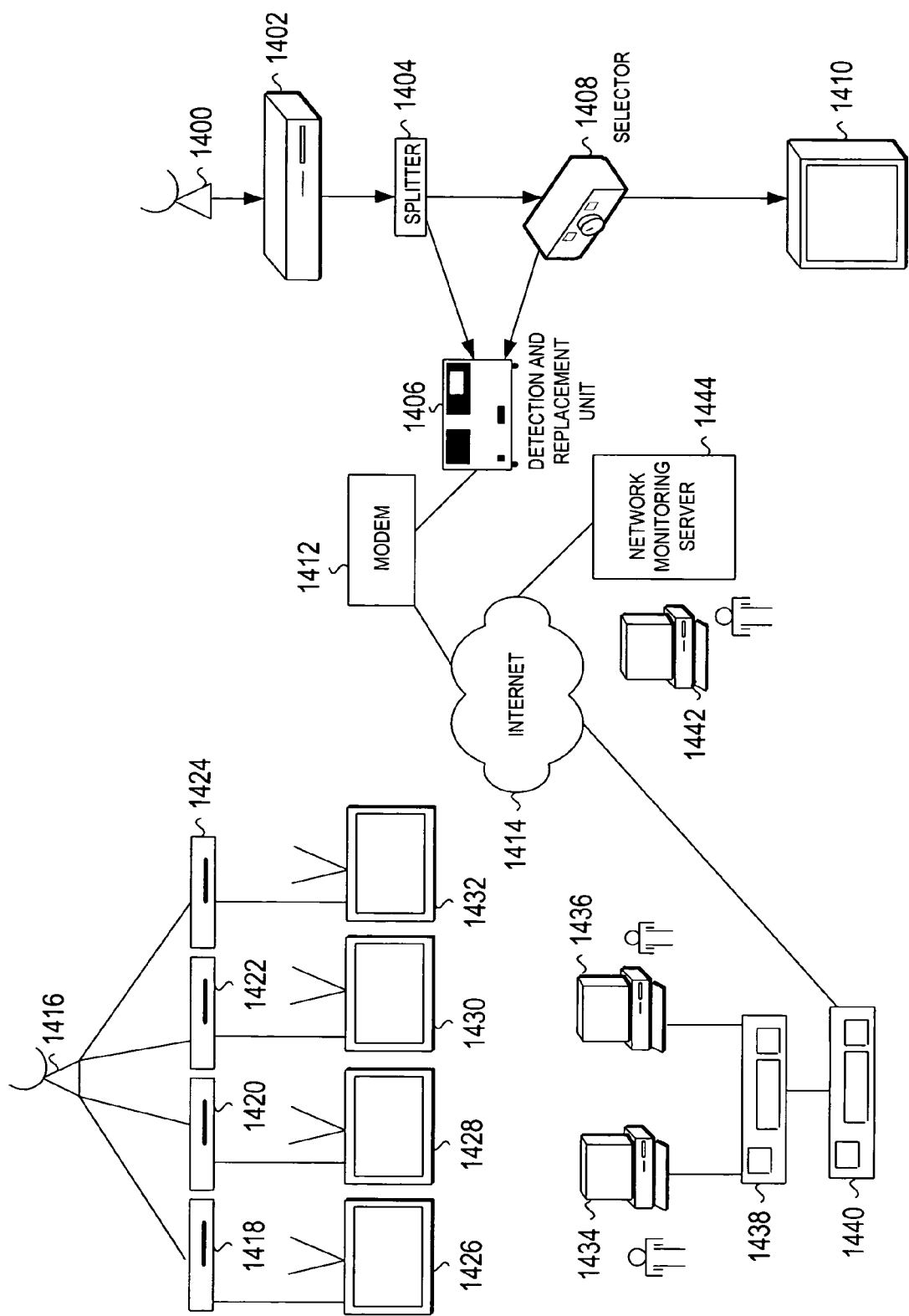
FIG. 14 is a block diagram illustrating an example of a remote manual triggering configuration, according to an embodiment of the present invention.

FIG. 14 is a block diagram illustrating an example of a remote manual triggering configuration, according to an embodiment of the present invention.

A receiving dish 1400, a set top box 1402, a splitter 1404, a selector 1408, and an output device 1410 all operate similar to their counterparts as described in the corresponding description to FIG. 6. As discussed previously, the splitter 1404 and the selector 1408 can exist as components inside a detection/replacement device 1406, and/or these components can also exist separately as well, which can also serve as an emergency bypass switch.

The detection/replacement device 1406 in this embodiment is connected to a modem 1412 which is connected to a computer communications network. A computer communications network is a network for transmitting digital packets across nodes, such as the Internet 1414. The signal connected to the detection/replacement device 1406 is typically (although not necessarily) connected to a different signal than the video signal itself.

The detection/replacement device 1406 receives a trigger signal from the modem 1412 via the Internet 1414. The trigger signal tells the detection/replacement device 1406 information regarding a presence of detected segments which may be replaced by the detection/replacement device. Thus, instead of the automatic detection as described with regard to FIG. 2, the trigger signal can initiate a replacement operation, but otherwise the operation of the remaining components in FIG. 14 are typically the same as their counterparts in FIG. 6.

The trigger signal in a manual detection embodiment is generated by using human intelligence in detecting segments such as advertisements. Typically, a human watches a broadcast, and when he or she sees an advertisement, a switch (or key) is pressed. When the advertisement(s) is/are over, the same (or different) switch (or key) is pressed. In this manner, a foolproof way of detecting advertisements can be achieved.

A receiving dish 1416 (or any other receiving method such as a cable) receives a video signal. The video signal is (optionally) split and transmitted to tuner A 1418, tuner B 1420, tuner C 1422, and tuner D 1424, which in turn is output on TV A 1426, TV B 1428, TV C 1430, and TV D 1432, respectively. Of course, instead of one signal source (receiving dish 1416), different sources can be used for each tuner. Monitoring workstation A 1434 and monitoring workstation B 1436 are operated by human operators watching their assigned respective TVs.

For example, an operator manning monitoring workstation A 1434 may be assigned to watch TV A 1426 and TV B 1428 (or just assigned a single TV), and indicate the presence of advertisements on his or her laptop (or other computer) by pressing relevant keys.

When an operator indicates on his or her respective computer the presence of an advertisement, a trigger signal is transmitted to a hub 1438. The hub 1438 is connected to a modem 1440 which transmits the trigger signal to a computer communications network such as the Internet 1414.

The trigger signal described above can be transmitted via the Internet 1414 to a network monitoring workstation 1442 and/or network monitoring server 1444. The network monitoring workstation 1442 receives the signals described above, processes them, and can store them in the network monitoring server 1444. The network monitoring workstation 1442 receives the trigger signals and transmits the trigger signals via the Internet 1414, or other computer communications network, to the detection/replacement device of recipients, such as detection/replacement device 1406 via modem 1412. A list of recipients, with their IP or other address information, can be maintained on the network monitoring server 1444.

The trigger signal transmitted to recipients can be in the form of a digital record or packet. The record may contain information regarding the presence of an advertisement, a length or estimated length, if known, of the advertisement, a channel which the record was detected on, a time, a type, and/or any other relevant information. A unique ID may be given to each advertisement triggered for identification and/or synchronization purposes. The type may comprise an advertisement, intro/outro, newscast, or any other category a segment can fall into.

Tables I and II below provides examples of possible records which could comprise a trigger signal.

TABLE I

| | |
|---|---|
| Status: | Ad start |
| Type: | Advertisement |
| ID: | 45233 |
| Channel: | 3 (or alternatively a network identifier such as CNN) |
| Time: | 21:04:03 |
| Estimated length: | Unknown |

TABLE II

| | |
|---|---|
| Status: | Ad over |
| Type: | Advertisement |
| ID: | 45233 |
| Channel: | 3 |
| Time: | 21:04:33 |
| Estimated length: | 30 |

The format used in Tables I and II is just for exemplary purposes, and the field identifiers (such as "channel," etc.) may not really exist in the packet but are provided for ease of understanding. Additional fields may be present or some fields may be optional and not used. Not illustrated in Tables I and II are any other data known in the art needed to transmit data across a computer communications network, such as headers, IP addresses, etc.

The network monitoring workstation 1442 and server 1444 can also optionally monitor the status of the recipients. The status can comprise any combination of the following: a monitoring status (such as "OK", "offline", "disabled"), a channel a recipient is tuned to, a mode (e.g., programming or ad insertion), or any other characteristic of the recipient's equipment. The status can be ascertained by receiving update signals from the recipients over the Internet 1414 (or other computer communications network).

The trigger signal transmitted from the monitoring workstation(s) 1434, 1436 to the network monitoring station 1442 may take a different form from the final trigger signal transmitted from the network monitoring station 1442 to the recipient(s) 1406, or it may be the same form. It is also possible that the monitoring workstation(s) 1434, 1436 and the network monitoring station 1442 may be at the same location, thereby obviating the need for using the Internet (or other network) to transmit between the two stations. The network monitoring station 1442 may also be optional, and the trigger signal can also be transmitted directly to recipient(s) 1406 from the monitoring workstation(s) 1434, 1436. In this latter embodiment, a network monitoring station 1442 may still be used to monitor the status of a plurality of channels. With such monitoring, an operator can view an indicator of the plurality of the channels and their status (e.g., programming, advertising, intro, outro, etc.).

Any detection/replacement device 1406 configured for use with this embodiment can receive trigger signals from the Internet 1414, decode the trigger signals, determine if each trigger signal received applies to an output currently being viewed, and if so, take appropriate action.

The channel included in the trigger signal record is important because trigger signals may be transmitted spanning many channels. The detection/replacement device 1406 should typically know which channel the set top box 1402 is tuned to so that the detection/replacement device 1406 will act only on trigger signals affecting a currently tuned channel.

The detection/replacement device 1406 can detect the currently tuned channel in a number of ways. A signal can be transmitted from the set top box 1402 (or other video source) directly to the detection/replacement device 1406 so that the detection/replacement device 1406 knows the currently tuned channel. Alternatively, an operator may program the detection/replacement device 1406 with the currently tuned channel, for example by entering this channel directly into the detection/replacement device 1406. In yet another embodiment, the detection/replacement device 1406 may be combined with the set top box 1402, thus no redundant programming of the channel is necessary.

In an alternative to the previous methods of channel detection in which the detection/replacement device is "told" the current channel, the currently tuned channel may be automatically detected. Automatic channel detection can be performed by the detection/replacement device 1406 using vertical blanking interval (VBI) data and/or fingerprint data. The monitoring workstation 1442 (or other component in the system) can monitor and generate channel identity data. Channel identity data is data used to identify a channel and can compnrse VBI data, fingerprint data, such as color coherence vectors, etc., or any other characteristic of video or audio on a particular channel. The channel identity data can optionally be compressed or hashed and transmitted (via any computer communications or other network) to recipients along with its respective channel. Time information should also be transmitted with the other data as well so that the recipients can identify corresponding frame(s) to try and match signal data to. Recipients may need to store previous video signal data in a buffer to account for a delay in receiving channel identity data over the computer communications network. Recipients can then analyze the video on the currently tuned channel (or in the buffer) and compare it to the received channel identity data (of course the same analysis method should be used). If there is a match, the recipient has determined which channel the video signal is tuned to. The automatic detection of a current channel is not necessary if one of the other methods of identifying a current channel described in the previous paragraph is available.

Figure 15:
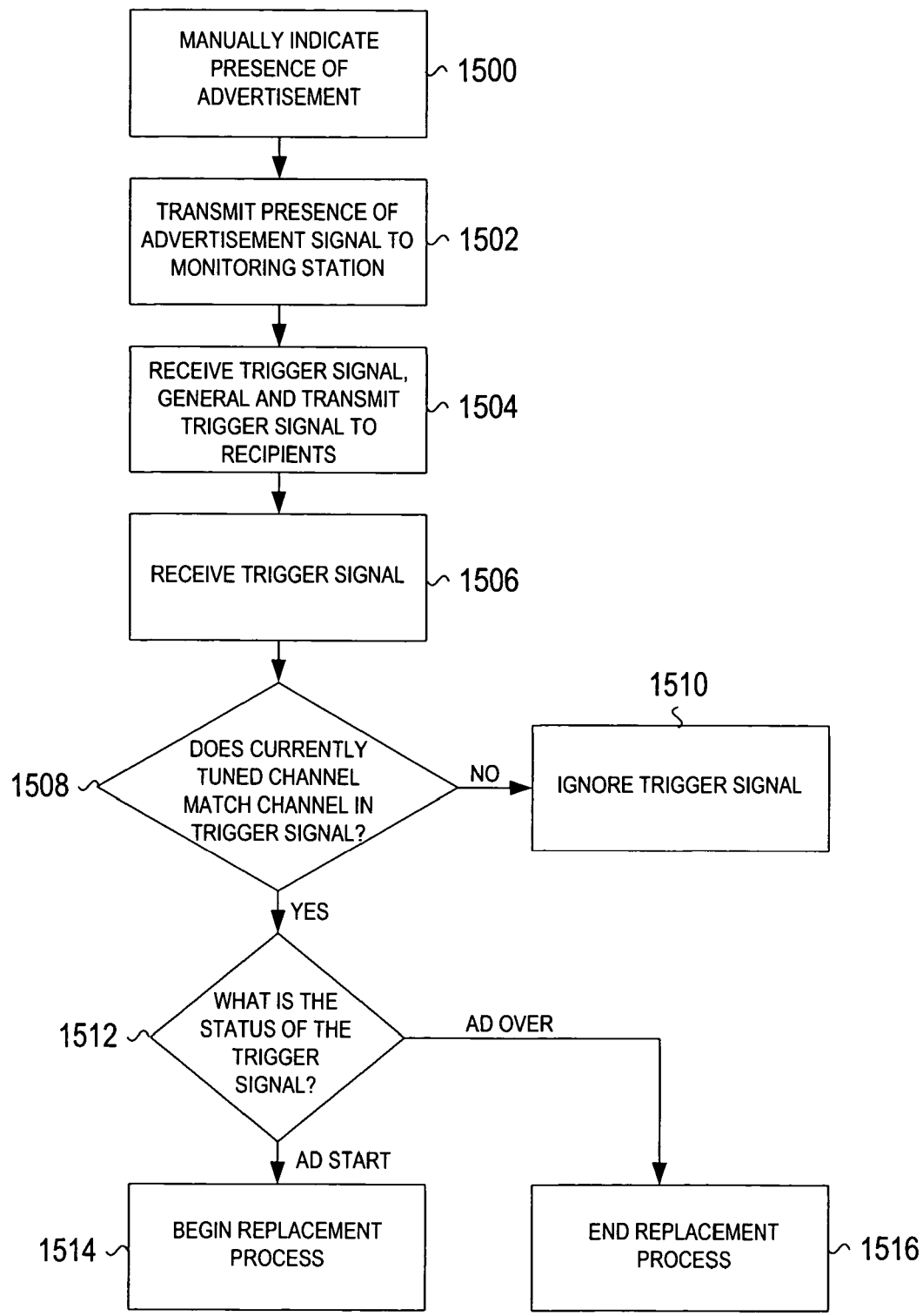
FIG. 15 is a flowchart illustrating a method of using remote manual triggering to identify advertisements, according to an embodiment of the present invention.

FIG. 15 is a flowchart illustrating a method of using remote manual triggering to identify advertisements, according to an embodiment of the present invention.

The method begins with operation 1500, which manually indicates a presence of an advertisement. This is typically performed at a monitoring workstation by a human pressing a button or key upon viewing an advertisement.

From operation 1500, the method proceeds to operation 1502, which transmits the presence of an advertisement to a central server. This is also performed by the monitoring workstation.

From operation 1502, the method proceeds to operation 1504 which receives the trigger signal from a monitoring workstation and transmits the trigger signal to recipients. This operation is typically performed by the network monitoring station.

From operation, the method proceeds to operation 1506, which receives the trigger signal by the recipients over the computer communications network. The trigger signal is received and decoded as known in the art to obtain relevant field values.

From operation 1506, the method proceeds to operation 1508 which checks if the currently tuned channel matches a channel referred to in the trigger signal. This operation can also match other information such as a time indicated in the trigger signal (if the trigger signal is too old, it should not be acted upon). If the check in operation 1508 determines that there is not a match, then the method proceeds to operation 1510 which ignores the trigger signal.

If the check in operation 1508 determines that there is a match, then the method proceeds to operation 1512 which checks the status of the trigger signal. If the status of the trigger signal is "Ad Start" (or other indicator that an advertisement or other segment is beginning), then the method proceeds to operation 1514 which beings the replacement process as described herein.

If the status of the trigger signal is "Ad Over", then the method proceeds to operation 1516 which ends the replacement process as described herein.

Other scenarios not illustrated in FIG. 15 may occur and should be handled accordingly. For example, if a channel is changed during a currently replaced commercial, then typically the generating of the replacement portion should be terminated and the new channel should be output without replacement. If a new channel changed to is in the middle of an advertisement, this can be handled at least one of two ways: if trigger signals for other channels are temporarily saved by the recipient, the recipient apparatus could then know that a newly tuned channel contains an ad and thus a replacement segment may be initiated (if time permits); or the advertisement on the newly tuned channel can just be displayed normally and the trigger signal indicating the end of the current advertisement would not be acted upon.

Typically, the recipients (or subscribers) to the trigger signals are constantly monitoring for and receiving trigger signals from the network. Upon receipt of a trigger signal, the method in FIG. 15 is initiated.

It is also noted that in any of the embodiments described herein, an optional time delay may exist between when a frame is broadcast universally and when that frame is actually displayed using any of the configurations described herein. The reason for the time delay is that when performing a manual detection, a slight delay is experienced before a human identifies an advertisement (or other segment) in a broadcast. A delay may also exist using automated detection as well while frames are analyzed and matched. In addition, there may be a delay in receiving signals across the computer communications network. Thus, it is desirable to maintain a slight delay (e.g., 5 seconds) between the current output of video (whether a replacement segment is being output or not) and the original signal so that there will be no change to the non-advertising content. This will offset any delay in detecting segments and the delay should typically be unknown to viewers. A temporary storage (such as flash memory, RAM, or a hard drive) can be used to store the buffer of video and audio data during the delay period, and video/audio output is actually generated from this buffer. This memory buffer may exist inside the detection/replacement device.

A combination of manual and automatic detection can also be used in case one fails. For example, a detection/replacement device can be configured for automatic detection, but if there is a failure of the auto detect system, then manual detection can be used (either locally or remotely). Alternatively, manual detection can be the default and automatic detection can be used as a back. In a further embodiment, both types of detection can be used at the same time. For example, if either an automatic detection or a manual detection indicates a presence of an advertisement, then the system can process the advertisement accordingly. Alternatively, one method (manual or automatic/local or remote) can take precedence over another.

In yet a further embodiment, a "peer to peer" detection system may be used. If one establishment using a detection/replacement system detects an advertisement (manually or automatically or both), the establishment can share this information with other establishments on the computer communications network by sending a trigger signal to other interested establishments (it may contain a list of other establishments locally or request such a list from monitoring workstation). This might be the case when establishments such as pubs are affiliated with one another and trust another's detections. The trigger signal should ideally contain the location of origin of the signal and the manner by which an advertisement was detected. Such a trigger signal can also be addressed to the monitoring workstation, which can then re-transmit the trigger signal to known recipients, preferably with an indication of the origin of the signal in the record. Establishments may configure their systems not to act upon ("trust") detections from other establishments.

In yet another embodiment of the present invention, individual channels in a composite video signal comprising numerous channels can be simultaneously processed with their advertisements (or other detected segments) replaced with replacements. Thus, an input signal comprising numerous channels can be input into a system and an output can comprise a composite signal with the programming on each of the individual channels but with replacements therein. This embodiment can be especially useful for enterprises like hotels and/or hospitals, which may desire to target advertisements to individual patrons who receive a composite signal and can tune to whichever channel the patron wishes. This embodiment can also be used in combination with any other embodiment or configuration described herein.

Figure 16:
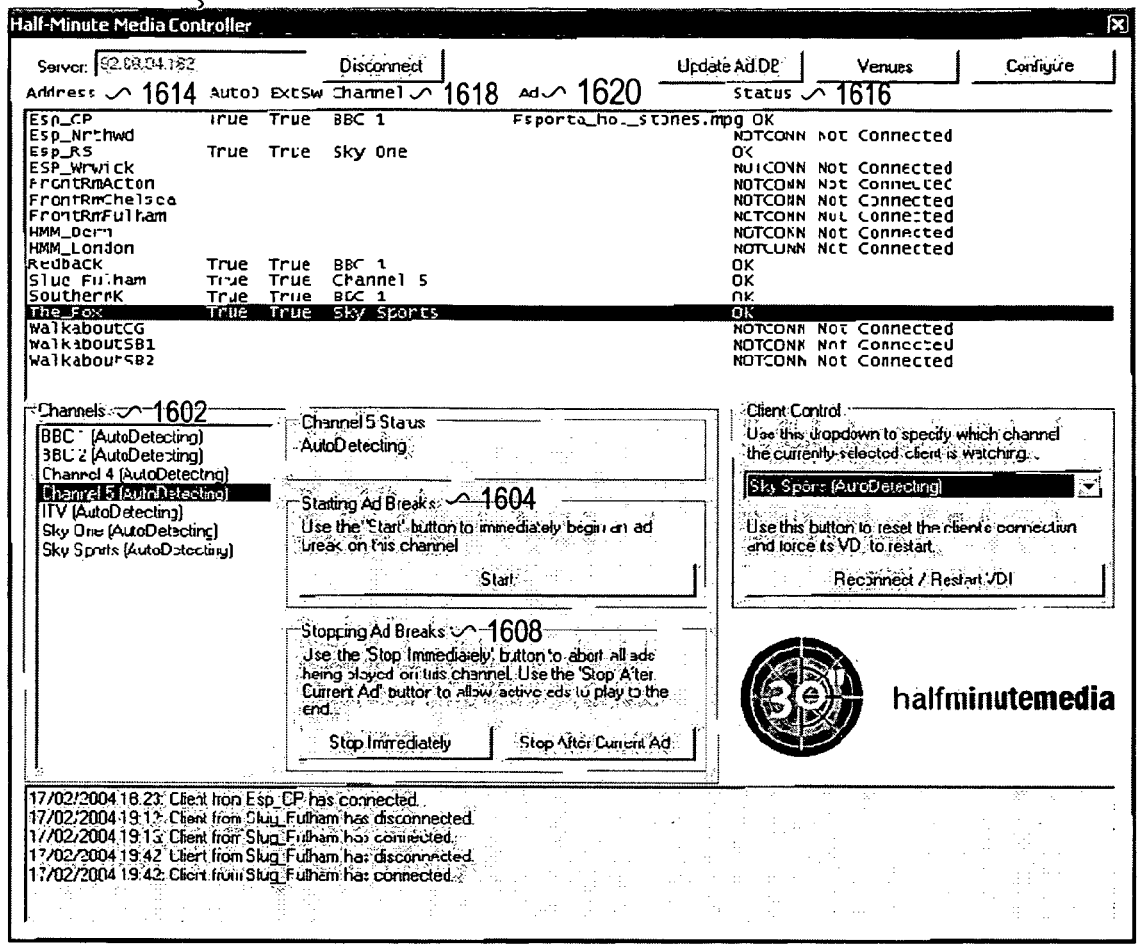
FIG. 16 is a screen shot illustrating one example of user interfaces, according to an embodiment of the present invention.
Figure 16:
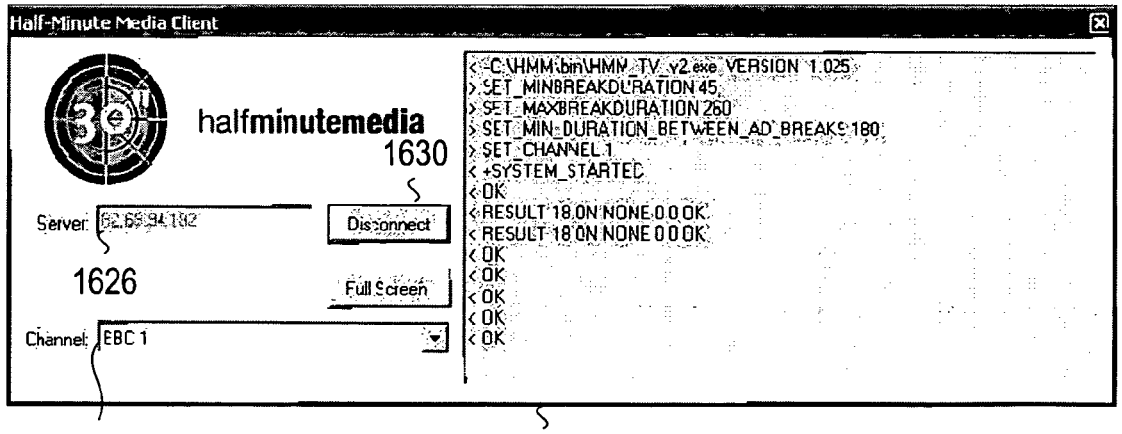

FIG. 16 is a screen shot illustrating one example of user interfaces, according to an embodiment of the present invention.

A channel monitor window 1600 is used by a human monitor to indicate when commercial starts. A channel indicator 1602 is used to select/indicate a channel being monitored. Start ad break buttons 1604 are used by the operator to indicate a beginning of an advertisement. For example, upon a beginning of an advertisement the operator can push a button indicating that the operator believes the ad break will last 10 seconds. Additional "extend ad break buttons" could be used by the operator to indicate that the current ad will last longer than indicated by using the start ad break buttons 1604. Stop ad break buttons 1608 are used to indicate when an ad is going to end (either immediately or in a predetermined time interval). A "time remaining bar" could indicate how much time is remaining in the current ad break according to the inputs by the operator. Alternatively, a simple ad start/ad stop button (same or two different buttons) can be used.

A network status window 1612 is used by a network monitoring station to monitor status of recipients (e.g., pubs, hospitals, etc.) An address column 1614 indicates each respective recipient being monitored. A status column 1616 indicates the status of each respective node (e.g., a currently tuned channel). A channel column 1618 indicates a channel a respective node is tuned to. A advertisement column 1620 indicates a mode the recipient equipment is in (e.g., inserting an ad or watching a program) and may also indicate the particular advertisement being played. A "last status column" could indicate a last time a status update was received by that node.

A recipient status window 1624 is used by a recipient to monitor a current status of the system. A channel indicator 1622 indicates a currently tuned channel. This indicated channel can either be automatically detected, or an operator can use the channel indicator 1622 to identify a channel currently being viewed. For example, a drop down menu can appear with all possible channels and the operator can select the current channel. A server IP address indicator 1626 indicates an IP address of a current server transmitting trigger signals across the computer communications network. A disconnect button 1630 can be used by a local operator to turn off the system, typically resulting in a channel being displayed on an output device as originally broadcast (with no ad replacements).

Figure 17:
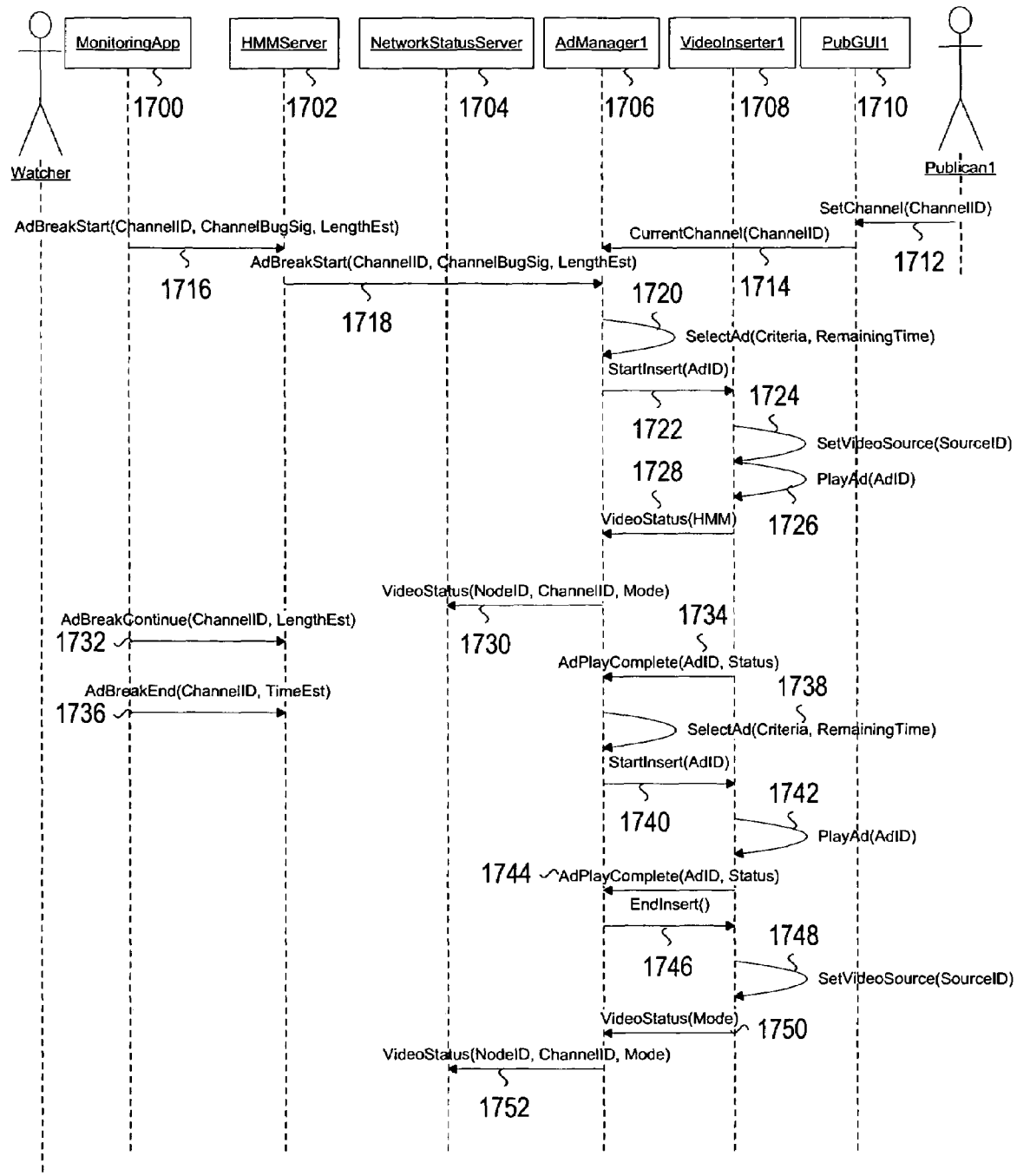
FIG. 17 is a sequence diagram illustrating a typical operation of the present invention, according to an embodiment of the present invention.

FIG. 17 is a sequence diagram illustrating a typical operation of the present invention, according to an embodiment of the present invention.

The sequence diagram shows operations occurring at a monitoring application 1700 (typically a monitoring workstation), a server 1702 associated with the monitoring application 1700, a network status server 1704 (typically associated with a network monitoring workstation), an ad manager 1706, a video inserter 1708 and a pub GUI 1710 (all three typically located at a recipient such as a pub). It is noted that this sequence diagram is just one possible implementation of the invention, although numerous other implementations can be used as well. Specific messages, function calls and names may vary.

First, a channel at the pub is selected by a local operator, and a SetChannel signal 1712 is transmitted to the pub GUI1 1710. The SetChannel signal 1712 comprises a currently tuned channel at the pub. Then, a CurrentChannel signal 1714 is transmitted from the pub GUI 1710 to the ad manager 1706. The CurrentChannel signal 1714 comprises the currently tuned channel.

An AdBreakStart signal 1716 is transmitted from the monitoring application 1700 to the server 1702, for example when a human operator views a commercial (this configuration can also be used for automatic detection as well). An AdBreakStart signal 1718 is then transmitted from the server 1702 to the ad manager 1706. The AdBreakStart signals 1716, 1718 are a trigger indicated at a beginning of an advertisement.

If the current channel (as transmitted in the current channel signal 1714) matches the current channel as contained in the AdBreakStart signal 1718, then the ad manager 1706 initiates a SelectAd operation 1720 which selects an advertisement to display, for example, from a queue. The ad manager 1706 then transmits a StartInsert signal 1722 to the video inserter 1708, which triggers a SetVideoSource operation 1724 (which can select a desired video source from a switch) and a PlayAd operation 1726 (which starts playback of the selected ad) to start an insertion of a replacement advertisement. Then, a VideoStatus signal 1728 is transmitted from the video inserter 1708 to the ad manager 1706. A VideoStatus signal 1730 is then transmitted from the ad manager 1706 to the network status server 1704. The VideoStatus signals 1728, 1730 are signals comprising the status of the recipient (e.g., node ID channel watched, mode, etc).

An AdBreakContinue signal 1732 and an AdBreakEnd signal 1736 are transmitted from the monitoring app 1700 to the server 1702. The AdBreakContinue signal 1732 is a signal indicating an ad will continue. The AdBreakEnd signal 1736 is a signal indicated an ad is over or will end at a certain interval.

An AdPlayComplete signal 1734 is transmitted from the video inserter 1708 to the ad manager 1706, initiating a SelectAd operation 1738 and then transmitting a StartInsert signal 1740 to the video inserter 1708, triggering a PlayAd operation 1742 which plays another ad. An AdPlayComplete signal 1744 is transmitted from the video inserter 1708 to the ad manager 1706. The AdPlayComplete signals 1734, 1744 are used to indicate completion of playing a particular ad. An EndInsert signal 1746 is transmitted from the ad manager 1706 to the video inserter 1708, triggering a SetVideoSource operation 1748 which changes the video source back to the broadcast source.

A VideoStatus signal 1750 is then transmitted from the video inserter 1708 to the ad manager 1706. A video status signal 1752 is then transmitted from the ad manager 1706 to the network status server 1704.

Figure 18:
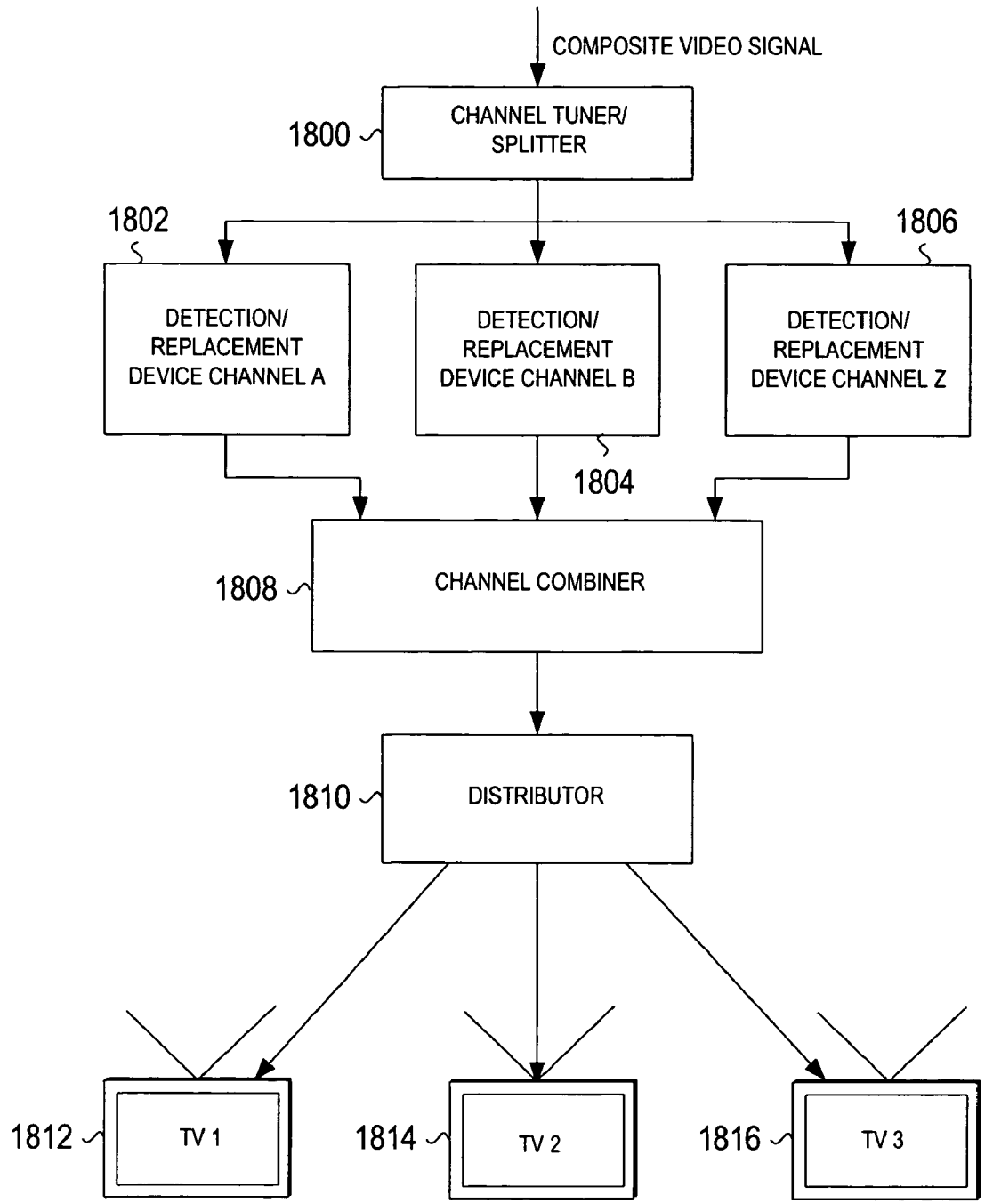
FIG. 18 is a block diagram illustrating apparatus for processing a composite video signal, according to an embodiment of the present invention.

FIG. 18 is a block diagram illustrating an apparatus for processing a composite video signal, according to an embodiment of the present invention.

A composite signal (from any type of source such as satellite dish, land cable, etc.) enters into a channel tuner/splitter 1800. The channel tuner/splitter 1800 tunes to a plurality of channels contained in the composite signal and splits each channel into a different output. The channel tuner/splitter 1800 may simply comprise a splitter generating output to a plurality of tuners (each tuned to a particular channel) with an output for each. The channel tuner/splitter 1800 may also comprise an amplifier and/or any other hardware needed to accurately perform its operations as known in the art.

Detection/replacement device A 1802 receives output from the channel tuner/splitter 1800 which comprises a video signal for channel A, and then performs the detection/replacement using any of the methods/configurations described herein. The detection/replacement device A 1802 then outputs the (possibly) modified channel A to a channel combiner 1808. Not pictured in FIG. 6 is an optional connection from the detection/replacement device A 1802 to a computer communications network, which can be used to receive remote trigger signals or any other purpose. Also not pictured are other components described herein, such as a fingerprint storage, local advertisement storage, etc., which can be used and configured at the operators discretion.

Detection/replacement device B 1804 and detection/replacement device C 1806 operate similarly as detection/replacement device A 1802 and output their respective signal to the channel combiner 1808. It is also noted that alternative configurations can also be implemented, such as combining the tuner into each detection/replacement device, thus removing the need for the channel tuner/splitter 1800 and instead requiring just a splitter. Or alternatively, a single detection/replacement device can tune and process multiple channels simultaneously, reducing the required hardware even more.

Once the channels that have been processed are input into the channel combiner 1808, the channel combiner 1808 generates a composite signal from the inputs. Not all channels in the composite signal need to be processed, and such non-processed channels can be combined into the composite signal by the channel combiner 1808 in their intact original form. Such non-processed channels can be split by the channel tuner/splitter 1800 and passed straight to the channel combiner 1808.

After the individual channels are combined into a composite video signal by the channel combiner 1808, the composite signal is then output to a distributor 1810. The distributor 1810 then distributes the composite signal to multiple output devices such as television 1 1812, television 2 1814, and television 3 1816. Each of users of television 1 1812, television 2 1814, and television 3 1816 are free to tune the channel to a channel of their choosing. Some or all of the channels tuned by the user may contain replacement advertisements. This fact may even be transparent to the user.

This embodiment is advantageous to any establishment which transmits multiple video signals to clients or customers, such as hotels, hospitals, vehicles such as airlines (with individual output devices at each seat), schools, etc. For example, a hotel can replace standard advertisements with their own advertisements for their products (for example their own restaurants) and/or services and transmit the composite signals to some or all of their guest rooms.

In yet a further embodiment of the present invention, replacement portions (such as advertisements) displayed on the televisions (or other output device) can be targeted to individuals assigned to those televisions. For example, a hotel may wish to utilize the embodiment as described above and illustrated in FIG. 7. However, instead of using the same replacement portions for each television (and viewer), replacement portions can be specially targeted to each respective viewer of each television.

Thus, in the previous embodiments, advertisements can be targeted to both individual patrons as well as serving the benefit of the local operator (e.g., business owner such as a hotel or hospital).

Figure 19:
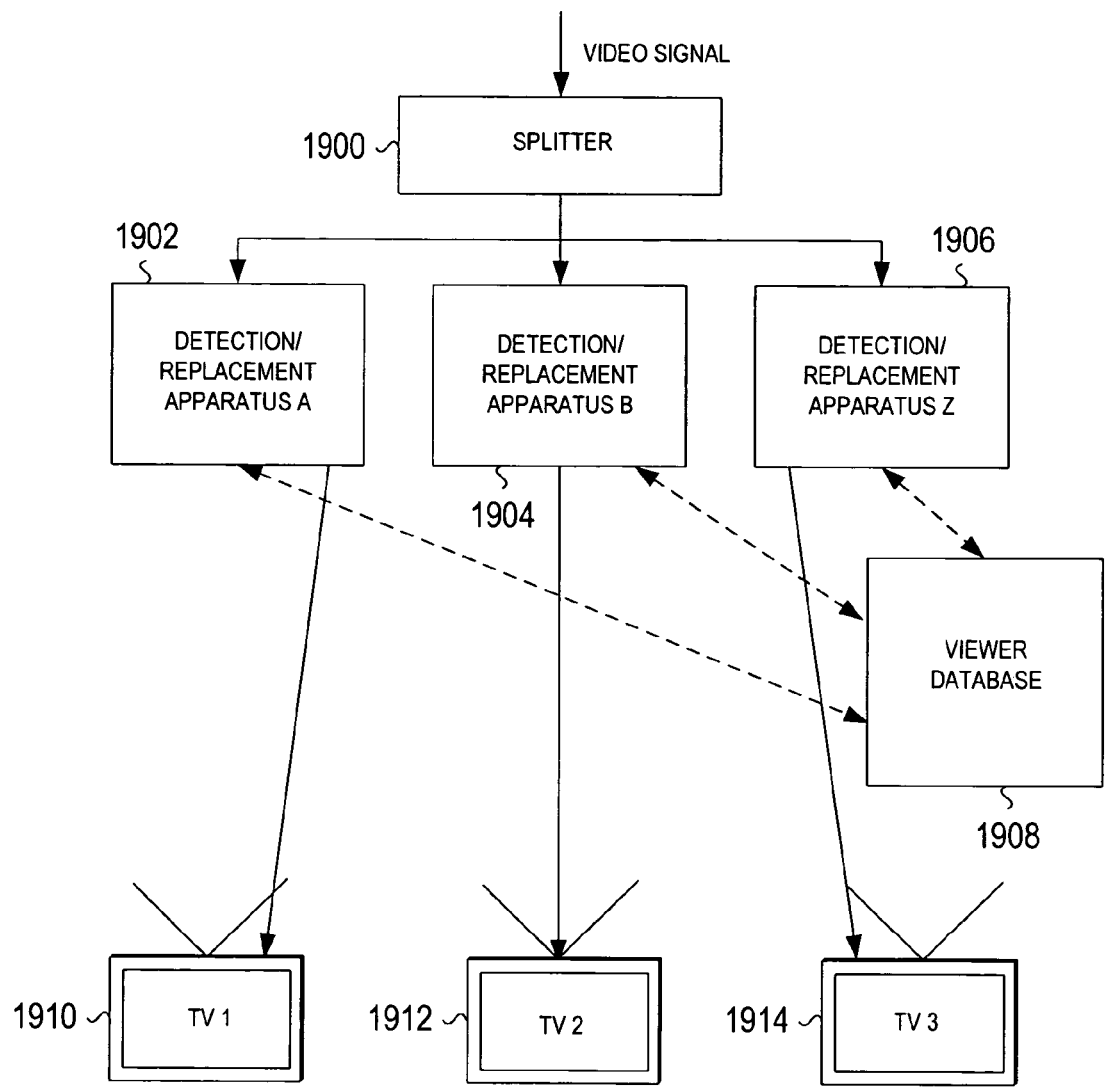
FIG. 19 is a block diagram illustrating an apparatus for targeting replacement portions based on a destination of the replacement portion, according to an embodiment of the present invention.

FIG. 19 is a block diagram illustrating an apparatus for targeting replacement portions based on a destination of the replacement portion, according to an embodiment of the present invention.

An original video signal enters a splitter 1900. The video signal can be any kind of video signal, analog, digital, single channel, composite, etc. The splitter 1900 splits the video signal into a plurality of additional signals which serve as inputs to detection/replacement apparatus A 1902, detection/replacement apparatus B 1904 and detection, insertion replacement C 1906.

Detection/insertion replacement A 1902 can comprise hardware using any configuration (including any combination) of any system(s) described herein. For example, this apparatus can process a composite video signal, an individual channel video signal, use local or remote detection, etc.

Detection/replacement apparatus A 1902 interfaces with a viewer database 1908 which may contain information regarding some or all of the viewers using the system. Depending on information found in the viewer database 1908, particular replacement portions can be selected.

Selecting appropriate replacement portions can be achieved by storing desired characteristics for each replacement portion. When it is time to choose a replacement portion, these characteristics are matched with a viewer's data in the database and replacement portions with positive matches are selected. Default replacement portions can also be used when there are no (or no remaining) matches for replacement portions.

After a particular replacement portion is selected, the detected segment is replaced with the replacement portion as described herein.

This same process is performed for each detection/replacement apparatus, e.g., detection/replacement apparatus A 1902, detection/replacement apparatus B 1904 and detection/replacement apparatus C 1906. The output for each of these apparatuses is output to output device A 1910, output device B 1912, and output device C 1914, respectively. If a composite signal is used in this embodiment, then individual channels are processed accordingly. The viewer may scan the channels and it may be transparent that advertisements on a plurality of channels have been replaced especially targeted for him or her.

As one example of this embodiment, a hotel may maintain a viewer database 1908 that contains information that viewer A (in a particular room) is from a particular state. The hotel may then wish to choose a replacement portion advertising products or services available in that state. For example if the viewer database 1908 stores that viewer A is from New York, then the hotel may wish to use as a replacement portion an advertisement for one of their other hotels located in New York. This particular advertisement can be used on any or all of the channels the viewer is able to watch. Any characteristics known to the viewer database 1908 can be used to select replacement portions. The viewer database 1908 can be for example be any SQL database as known in the art. The viewer database 1908 can be populated by any information known about a viewer, for example a hotel can use information in a patron's record to populate the patron's database record in the viewer database 1908, or the viewer database 1908 be the same database as the hotel uses itself for their records.

Figure 20:
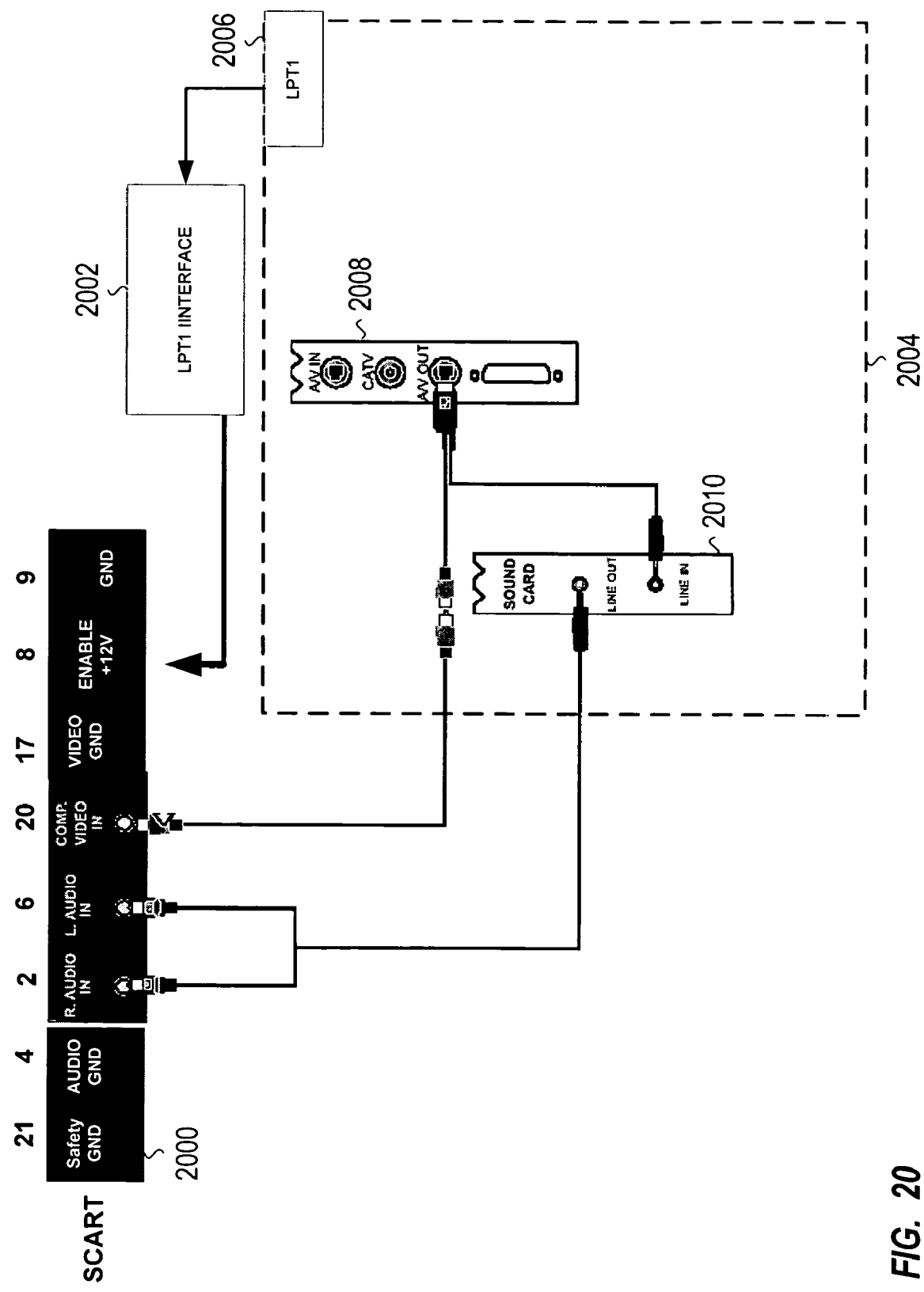
FIG. 20 is a circuit diagram illustrating connecting an ad inserter PC, according to an embodiment of the present invention.

FIG. 20 is a circuit diagram illustrating connecting an ad inserter pc, according to an embodiment of the present invention.

A connection apparatus 2000 is used to connect inputs to a television (either directly or through an indirect manner such as a splitter). Connection apparatus 2000 is one set of inputs to a switch (not pictured) such as selector 608. The other set of inputs into the switch comes from the original broadcast or signal. An LPT1 interface 2002 is connected to an LPT1 port 2006 of an ad inserter pc 2004. The LPT1 port 2006 is used to activate the connection apparatus 2000 so that if no on trigger is received by the connection apparatus 2000 then the inputs to the connection apparatus are not used by the connection apparatus and an alternate input source is used. Note that a serial port can also be used instead of a parallel port for this purpose.

A video card 2008, such as a ATI Radeon "All In Wonder"—9000, is used by the ad inserter PC 2004 which is connected to the connection apparatus 2000. A sound card 2010 is also used by the ad inserter PC 2004.

It is noted that all of the above embodiments can be configured with any combination of digital/analog inputs and digital/analog outputs in order to suit needs of the users.

Further, special arrangements can be made with networks and other originators of video programming in order to be able to replace advertisements. Originators may even provide trigger signals as part of the arrangement. Alternatively, replacements/detections can be made unilaterally.

It is also noted that any and/or all of the above embodiments, configurations, variations of the present invention described above can be mixed and matched and used in any combination with one another. Any claim (or subject matter therein) can be combined with any others (unless the results are nonsensical).

Moreover, any description of a component or embodiment herein also includes hardware, software, and configurations which already exist in the prior art and may be necessary to the operation of such component(s) or embodiment(s).

All embodiments of the present invention, including the ad reselling system, can be realized in a number of programming languages including (but not limited to) C, C++, Perl, HTML, Pascal, and Java, although the scope of the invention is not limited by the choice of a particular programming language or tool. Object oriented languages have several advantages in terms of construction of the software used to realize the present invention, although the present invention can be realized in procedural or other types of programming languages known to those skilled in the art.

The many features and advantages of the invention are apparent from the detailed specification. Thus, the appended claims are to cover all such features and advantages of the invention that fall within the true spirit and scope of the invention. Furthermore, since numerous modifications and variations will readily occur to those skilled in the art, it is not desired to limit the invention to the exact construction and operation illustrated and described. Accordingly, appropriate modifications and equivalents may be included within the scope of the invention.

Although this invention has been illustrated by reference to specific embodiments, it will be apparent to those skilled in the art that various changes and modifications may be made which clearly fall within the scope of the invention.

What is claimed is:

1. A method for video detection and replacement, the method comprising:
   receiving an input video signal;
   creating a temporal sliding window of initial length L seconds and running the sliding window the input video signal, such that at least a portion of the input video signal is captured by the temporal sliding window;
   comparing a first segment of the portion of the input video signal captured by the temporal sliding window of initial length L seconds to a portion of stored fingerprint data;
   expanding the temporal sliding window to have an expanded length approximately equal to the length of the stored fingerprint data if the first segment of the portion of the input video signal matches the portion of stored fingerprint data;
   comparing an expanded segment of the input video signal captured by the expanded window having the expanded length with the stored fingerprint data; and
   generating an output video signal comprising the input video signal, wherein the expanded segment of the input video signal is replaced with a replacement portion if the expanded segment of the input video signal matches the fingerprint data.

2. The method as recited in claim 1, further comprising;
   automatically receiving fingerprint data of segments to be identified via a computer communications network; and
   storing the fingerprint data.

3. The method as recited in claim 2, wherein the fingerprint data is transmitted periodically.

4. The method of claim 1, wherein the replacement portion comprises at least one advertisement.

5. The method of claim 1, wherein the replacement portion is selected based at least in part on the geographic location.

6. The method of claim 1, wherein the selection of a replacement portion is based at least in part on the received input video signal.

7. The method of claim 1, further comprising:

storing characteristics of the fingerprint data prior to the comparison of the first segment of the portion of the input video signal to the portion of stored fingerprint data;

storing characteristics of potential replacement portions prior to the comparison of the first segment of the portion of the input video signal to the portion of stored fingerprint data; and selecting the replacement portion based at least in part on comparing the characteristics of the stored fingerprint data and the characteristics of the potential replacement portions.

8. A method for video detection and replacement, the method comprising:

(a) receiving an input video signal;

(b) capturing a captured portion of L seconds of the received input video signal;

(c) comparing the captured portion of the input video signal to an L second long portion of stored fingerprint data, the stored fingerprint data having a total fingerprint length greater than or equal to L;

(d) if the captured portion of the input video signal matches the portion of stored fingerprint data, capturing an additional portion of the received input video signal, the additional portion being contiguous with the captured portion, such that an entire captured portion comprising the captured portion of the received input video signal plus the additional portion has an entire captured length that is approximately equal in length to the total fingerprint length of stored fingerprint data;

(e) comparing the entire captured portion of the received input video signal to the stored fingerprint data; and (f) generating an output video signal comprising the input video signal, wherein the entire captured portion of the input video signal is replaced with a replacement portion if the entire captured portion of the input video signal substantially matches the fingerprint data.

9. The method of claim 8, further comprising;

(g) automatically receiving fingerprint data of segments to be identified via a computer communications network; and (h) storing the fingerprint data.

10. The method of claim 9, wherein the fingerprint data is transmitted periodically.

11. The method of claim 8, wherein the replacement portion comprises at least one advertisement.

12. The method of claim 8, wherein the replacement portion is selected based at least in part on a geographic location.

13. The method of claim 8, wherein selection of a replacement portion is based at least in part on the received input video signal.

14. The method of claim 8, further comprising:

(g) storing characteristics of the fingerprint data prior to the comparison of step (c);

(h) storing characteristics of potential replacement portions prior to the comparison of step (c); and (i) selecting the replacement portion based at least in part on comparing the characteristics of the stored fingerprint data and the characteristics of the potential replacement portions.

* * * * *